(12) United States Patent
Azuma et al.

(10) Patent No.: US 7,545,415 B2
(45) Date of Patent: Jun. 9, 2009

(54) INFORMATION-ADDED IMAGE PICKUP METHOD, IMAGE PICKUP APPARATUS AND INFORMATION DELIVERY APPARATUS USED FOR THE METHOD, AND INFORMATION-ADDED IMAGE PICKUP SYSTEM

(75) Inventors: Takeo Azuma, Nara (JP); Jun Ozawa, Nara (JP); Kenya Uomori, Osaka (JP)

(73) Assignee: Panasonic Corporation, Osaka (JP)

( * ) Notice: Subject to any disclaimer, the term of this patent is extended or adjusted under 35 U.S.C. 154(b) by 944 days.

(21) Appl. No.: 10/483,106

(22) PCT Filed: Nov. 27, 2002

(86) PCT No.: PCT/JP02/12395
§ 371 (c)(1),
(2), (4) Date: Jan. 7, 2004

(87) PCT Pub. No.: WO03/047239
PCT Pub. Date: Jun. 5, 2003

(65) Prior Publication Data
US 2004/0175169 A1    Sep. 9, 2004

(30) Foreign Application Priority Data
Nov. 27, 2001    (JP) .............................. 2001-360546

(51) Int. Cl.
*H04N 5/76* (2006.01)
(52) U.S. Cl. .................................. 348/231.3; 348/231.6
(58) Field of Classification Search ............. 348/231.3, 348/231.6, 116, 157; 396/310, 319
See application file for complete search history.

(56) References Cited

U.S. PATENT DOCUMENTS

| | | | | |
|---|---|---|---|---|
| 5,296,884 A | * | 3/1994 | Honda et al. ................. | 396/311 |
| 5,745,110 A | * | 4/1998 | Ertemalp ..................... | 715/764 |
| 6,282,362 B1 | * | 8/2001 | Murphy et al. ................ | 386/46 |
| 6,337,951 B1 | | 1/2002 | Nakamura | |
| 6,396,537 B1 | * | 5/2002 | Squilla et al. ............... | 348/239 |
| 6,633,267 B2 | | 10/2003 | Numa | |
| 6,690,883 B2 | * | 2/2004 | Pelletier ..................... | 396/321 |

(Continued)

FOREIGN PATENT DOCUMENTS

JP        2-303285 A    12/1990

(Continued)

OTHER PUBLICATIONS

International Search Report for PCT/JP02/12395, mailed Mar. 18, 2003, ISA/JPO.

*Primary Examiner*—Tuan V Ho
*Assistant Examiner*—Gary C Vieaux
(74) *Attorney, Agent, or Firm*—Harness, Dickey & Pierce, P.L.C.

(57) ABSTRACT

An information-added imaging method includes an imaging step, a receiving step of an imaging device (105) receiving information through a communication line (112), an adding step of adding additional information to picture data on the basis of the information, a displaying step of displaying, in the imaging device (105), picture data to which the additional information has been added while picture data is being captured, and a recording step of recording the picture data to which the additional information has been added.

5 Claims, 16 Drawing Sheets

U.S. PATENT DOCUMENTS

| | | | |
|---|---|---|---|
| 7,007,243 B2 * | 2/2006 | Baldino .................... 715/853 |
| 7,009,643 B2 * | 3/2006 | Nakamura et al. ....... 348/231.4 |
| 7,088,389 B2 * | 8/2006 | Shibasaki et al. .......... 348/239 |
| 7,102,670 B2 * | 9/2006 | Seaman et al. ........... 348/231.6 |
| 7,109,848 B2 * | 9/2006 | Schybergson ............ 340/309.7 |
| 2002/0076217 A1 * | 6/2002 | Rodriguez et al. ............ 396/72 |
| 2002/0085111 A1 * | 7/2002 | Heiman ................ 348/333.01 |

FOREIGN PATENT DOCUMENTS

| | | | |
|---|---|---|---|
| JP | 02303285 A | * | 12/1990 |
| JP | 7-288725 A | | 10/1995 |
| JP | 09065268 A | | 3/1997 |
| JP | 09205681 A | | 8/1997 |
| JP | 09233465 A | | 9/1997 |
| JP | 10-161227 A | | 6/1998 |
| JP | 11-72348 A | | 3/1999 |
| JP | 11072348 A | * | 3/1999 |
| JP | 411072348 A | * | 3/1999 |
| JP | 11-142782 | | 5/1999 |
| JP | 2001157163 A | | 6/2001 |
| JP | 2001-189902 | | 7/2001 |
| JP | 2001211364 A | | 8/2001 |
| JP | 2001292411 A | | 10/2001 |

* cited by examiner

| ID | Voice | Moving image |
|---|---|---|
| 1 | Elephant.wav | Elephant.mpg |
| 2 | Alligator.wav | Alligator.mpg |
| 3 | Giraffe.wav | Giraffe.mpg |
| ... | ... | ... |

FIG. 14

| Frame No. | Name of event (Hierarchy 1) | Name of event (Hierarchy 2) | Place information | Time |
|---|---|---|---|---|
| 1 | Sports meeting | March of competitors | ×× Elementary school | Nov. 10, 2002 9:11:03 |
| 2 | March of competitors | March of competitors | ×× Elementary school | Nov. 10, 2002 9:11:03 |
| 3 | March of competitors | March of competitors | ×× Elementary school | Nov. 10, 2002 9:11:03 |
| 4 | March of competitors | March of competitors | ×× Elementary school | Nov. 10, 2002 9:11:03 |
| 5 | March of competitors | March of competitors | ×× Elementary school | Nov. 10, 2002 9:11:03 |
| 6 | March of competitors | March of competitors | ×× Elementary school | Nov. 10, 2002 9:11:03 |
| 7 | March of competitors | March of competitors | ×× Elementary school | Nov. 10, 2002 9:11:03 |
| ... | ... | ... | ... | ... |
| 9000 | Opening declaration | Opening declaration | ×× Elementary school | Nov. 10, 2002 9:16:03 |

# INFORMATION-ADDED IMAGE PICKUP METHOD, IMAGE PICKUP APPARATUS AND INFORMATION DELIVERY APPARATUS USED FOR THE METHOD, AND INFORMATION-ADDED IMAGE PICKUP SYSTEM

TECHNICAL FIELD

The present invention relates to an imaging device, such as a digital still camera for taking a still picture or a video camera for taking a moving picture, that additionally has a communication facility.

BACKGROUND ART

Recently, digital still cameras and video cameras capable of recording picture data digitally by using a hard disk or a DVD have been widely spread, and users can easily take pictures of subjects by using these equipment. Also, as a result of increased capacity of recording media and digitalization of picture data, moving picture data of a long time period and massive still picture data can be recorded.

Although massive picture data can be thus easily recorded, a conventional device can record picture data alone. Therefore, when a user reproduces picture data that he or she has recorded, it may be difficult to determine when and where the picture data is captured.

Accordingly, a user performs, after recording picture data, an editing work of the picture data for adding information such as a date and a place of the capture to the picture data.

For easing such an editing work, a digital camera or a video camera in which information such as a date and a place of the capture is added to picture data to be recorded has been known (for example, see Japanese Laid-Open Patent Publication Nos. 9-65268, 2001-157163, 2001-211364 and 2001-292411).

Although information such as a date and a place of the capture is necessary for the editing work performed after recording the picture data, a user knows the date and the place while he or she is actually taking pictures. Therefore, such information is not significant for the user while he or she is actually taking pictures.

On the other hand, in taking pictures in an event in which a plurality of event items are successively held with time, such as a sports meeting, a user (cameraman) sometimes checks which sport is being played with reference to a program of the sports meeting. In other words, while he or she is actually taking pictures of the sports meeting, necessary information for the user is not information such as a date and a place of the sports meeting but information about the progress of the sports meeting.

Furthermore, in the case where pictures are taken in, for example, a sight-seeing resort, if a user can be informed of information about the sight-seeing resort, he or she can take pictures in an appropriate composition on the basis of the information or can take pictures of all sights that should not to be missed (such as places of scenic beauty and historic interest). In other words, while a user is actually taking pictures in a sight-seeing resort, information about the sight-seeing resort is necessary information for the user.

The present invention was devised in consideration of these situations, and an object is improving convenience for a user by providing necessary information for the user while he or she is taking pictures.

DISCLOSURE OF THE INVENTION

The information-added imaging method according to this invention is a method for adding additional information to picture data captured by an imaging device.

The information-added imaging method includes an imaging step of the imaging device capturing picture data; a receiving step of the imaging device receiving information through a wireless and/or wire communication line; an adding step of adding additional information to the picture data captured in the imaging step on the basis of the information received in the receiving step; a displaying step of displaying, in the imaging device, picture data to which the additional information has been added in the adding step while picture data is being captured in the imaging step; and a recording step of recording the picture data to which the additional information has been added in the adding step.

In this method, the additional information is added to the picture data captured in the imaging step on the basis of the information received in the receiving step. The picture data to which the additional information has been added is displayed in the imaging device while picture data is being captured in the imaging step. The picture data to which the additional information has been added may be displayed on, for example, a viewfinder or a liquid crystal monitor provided to the imaging device.

In this manner, a user can grasp the additional information while he or she is capturing picture data with the imaging device. When this additional information is information necessary for a user that is capturing picture data, the user can take pictures on the basis of the information. As a result, convenience for the user can be improved.

Furthermore, the picture data in which the additional information has been added is recorded in the recording step. In a reproducing step of reproducing the recorded picture data, the additional information added to the picture data is preferably reproduced together with the picture data.

Information about an event in which a plurality of event items are successively held with time may be received in the receiving step.

In this case, information about an event item delivered in accordance with progress of the event may be received in the receiving step. In other words, push information delivery may be performed for the imaging device in accordance with the progress of the event.

Also, in the adding step, the additional information may be updated every time information is received in the receiving step and updated additional information may be added to the picture data.

Thus, the additional information is updated on the basis of the information received in accordance with the progress of the event. Then, the picture data to which the updated additional information has been added is displayed. Therefore, the user can get information according to the progress of the event when he or she is taking pictures of the event.

Alternatively, the information-added imaging method may further include a requesting step of the imaging device making requests for delivering information at given time intervals through a communication line, and information about an event item delivered in response to a request made in the requesting step in accordance with progress of the event at time of making the request may be received in the receiving step. In other words, pseudo push information delivery may be performed for the imaging device.

Also, in the adding step, the additional information may be updated every time information is received in the receiving step and updated additional information may be added to the picture data.

Thus, information is delivered at given time intervals in response to the requests made in the requesting step, and therefore, information is received substantially in synchronization with the progress of the event. Then, every time the information is received, the additional information is updated on the basis of the information, and the picture data to which the updated additional information has been added is displayed. Therefore, the user can get information according to the progress of the event when he or she is taking pictures of the event.

In the case where reservation is made for making a request for informing start of a specified event item at timing when the specified event item is to be held, information about an event item corresponding to the content of the reservation delivered at the timing when the event item is to be held may be received in the receiving step. Also, when information is received in the receiving step, additional information may be added to the picture data on the basis of the received information in the adding step.

Thus, when information is received at timing when a specific event item is to be held, additional information is added to the picture data on the basis of the received information. Then, the picture data to which the additional information has been added is displayed in the imaging device. Therefore, the user can recognize that the specified event item is to be held. As a result, the user can definitely take pictures of a desired event item and record picture data of the event item. In other words, the user can avoid losing an opportunity for taking a picture of a desired event item.

A program of the event including a currently held event item and preceding and following event items may be displayed in accordance with progress of the event in the displaying step.

Alternatively, a program of the event including currently held and following event items may be displayed in accordance with progress of the event in the displaying step.

Thus, a program in accordance with the progress of the event is displayed in the imaging device, and therefore, the user can properly recognize the progress of the event.

Additional information having a hierarchical structure may be added to the picture data in the adding step. In this case, picture data to which additional information of a specified layer has been added may be displayed in the displaying step.

Thus, the user himself or herself can select necessary additional information so as to display it in the imaging device.

The information received in the receiving step may be additional information itself. In this case, the additional information received in the receiving step can be directly added to picture data in the adding step.

Alternatively, selection information for additional information stored in the imaging device may be received in the receiving step. In this case, the information-added imaging method preferably further includes a selecting step of selecting additional information on the basis of the selection information received in the receiving step. Also, additional information selected in the selecting step is preferably added to the picture data in the adding step.

This is effective when the additional information has such a large size like, for example, voice data or image data, that the additional information itself is difficult to receive. In other words, additional information with a large size is previously stored in the imaging device. Thus, selection information with a small size alone can be received in the receiving step. Then, additional information is selected in the selecting step on the basis of the selection information, so as to add the selected additional information to the picture data in the adding step. In this manner, additional information with a large size can be added to the picture data.

Information about a place where picture data is captured may be further added to the picture data to be recorded in the recording step. In this case, the information-added imaging method preferably further includes a map creating step of creating map data in which the place where the picture data is captured is shown on a map on the basis of the information about the place recorded in the recording step.

Thus, the user can easily check where the recorded picture data is captured by seeing the created map data.

The imaging device according to this invention is a device for adding additional information to picture data captured by an imaging part.

The imaging device includes a display part for displaying picture data captured by the imaging part; a recording part for recording picture data captured by the imaging part; a communication part for sending/receiving information through a wireless and/or wire communication line; and a control part for controlling the imaging part, the display part, the recording part and the communication part. The control part adds additional information to picture data captured by the imaging part on the basis of information received by the communication part, makes the display part display picture data to which the additional information has been added while capturing picture data with the imaging part and makes the recording part record the picture data to which the additional information has been added.

In this imaging device, when the communication part receives information, additional information is added to picture data on the basis of the information. Then, picture data to which the additional information has been added is displayed while picture data is being captured with the imaging part. Thus, the user can grasp the additional information while he or she is taking pictures with the imaging device. When this additional information is information necessary for the user that is taking pictures, convenience for the user can be improved.

Information received by the communication part may be information about an event in which a plurality of event items are successively held with time.

When this information is delivered in accordance with progress of the event, the control part preferably updates additional information every time the communication part receives information and adds updated additional information to the picture data.

Alternatively, the communication part may make requests for delivering information at given time intervals. In this case, namely, in the case where the information is delivered in response to a request for information delivery, the control part may update additional information every time the communication part receives information delivered in response to a request made by the communication part, and may add updated additional information to the picture data.

Also, in the case where the information is delivered in accordance with reservation for requesting for informing start of a specific event item at timing when the specific event item is to be held, when the communication part receives information about an event item corresponding to the content of the reservation delivered at the timing when the event item is to be held, the control part may add additional information to the picture data on the basis of the received information.

The control part may add, to the picture data, a program of the event including a currently held event item and preceding and following event items on the basis of the information received by the communication part.

Alternatively, the control part may add, to the picture data, a program of the event including currently held and following event items on the basis of the information received by the communication part.

When the information received by the communication part is additional information itself, the control part can directly add the additional information to the picture data.

On the other hand, the imaging device may further include a storage part for storing additional information. In this case, the control part preferably selects additional information stored in the storage part on the basis of information received by the communication part and adds selected additional information to the picture data.

The control part may make the recording part record information about a place where the picture data is captured to be further added to the picture data.

Thus, as described above, map data in which the place where the picture data is captured is shown on a map can be created on the basis of the recorded information about the place.

The information delivery device according to this invention is a device for delivering information to an imaging device through a wireless and/or wire communication line for allowing additional information to be added to picture data captured by the imaging device.

The information delivery device includes an information storage part for storing information about an event in which a plurality of event items are successively held with time; and a delivery part for delivering the information about the event stored in the information storage part to the imaging device.

The information delivery device may further include an information selection part for selecting information stored in the information storage part in accordance with progress of the event.

In this case, the delivery part may deliver information selected by the information selection part. In other words, the information delivery device may perform push information delivery in accordance with the progress of the event.

Alternatively, the delivery part may deliver information selected by the information selection part when a request for delivering information is received from the imaging device through a communication line. In other words, the information delivery device may perform pull or pseudo push information delivery.

The information delivery device may further include an information selection part for selecting information stored in the information storage part in accordance with reservation made for requesting for informing start of a specified event item at timing when the specific event item is to be held. In this case, the communication part preferably delivers information selected by the information selection part at timing when an event item corresponding to the content of the reservation is to be held.

The delivery part may deliver a program of the event including a currently held event item and preceding and following event items in accordance with progress of the event.

Alternatively, the delivery part may deliver a program of the event including currently held and following event items in accordance with progress of the event.

The information storage part may store information to be delivered to the imaging device in a hierarchical structure.

In this case, the delivery part may deliver information of all layers at one time in accordance with the progress of the event.

Alternatively, the delivery part may deliver, in response to a request from the imaging device, information of a requested layer.

The information-added imaging system according to this invention is a system for adding additional information to picture data captured by an imaging part.

The information-added imaging system includes a delivery part for delivering information through a wireless and/or wire communication line; a receiving part for receiving information delivered by the delivery part; an adding part for adding additional information to picture data captured by the imaging part on the basis of the information received by the receiving part; a display part for displaying picture data to which the additional information has been added by the adding part while picture data is being captured with the imaging part; and a recording part for recording picture data to which the additional information has been added by the adding part.

In this system, when information delivered by the delivery part is received by the receiving part, additional information is added to picture data by the adding part. Then, the picture data to which the additional information has been added is displayed in the display part while picture data is being captured by the imaging part. Thus, a user can grasp the additional information while he or she is taking pictures with the imaging part. When this additional information is information necessary for the user that is taking pictures, convenience for the user can be improved.

The information-added imaging system may include two or more delivery parts installed in positions away from one another for delivering information in accordance with the positions thereof. In this case, when the receiving part comes near to one of the delivery parts, the receiving part preferably receives information delivered from the near delivery part.

This system is suitable to, for example, a sight-seeing resort or a zoo. Specifically, when description is given by assuming it is provided in a zoo, the delivery part is installed correspondingly to and in the vicinity of each cage. Each delivery part delivers information about an animal kept in the corresponding cage. When a user with the receiving part comes near to any cage, the receiving part receives information delivered from the delivery part corresponding to the cage. The received information is information about an animal kept in the cage in the vicinity of the user. Additional information is added to picture data on the basis of the received information so as to be displayed in the display part. In this manner, the user can take pictures of the animal kept in the cage while checking the information about the animal and can record the picture data to which the additional information has been added.

The recording part may record information about a place where picture data is captured to be further added to the picture data. In this case, the information-added imaging system preferably further includes a map creating part for creating map data in which the place where the picture data is captured is shown on a map on the basis of the information about the place recorded by the recording part.

BRIEF DESCRIPTION OF DRAWINGS

FIG. 14 is a diagram for exemplifying the structure of picture data recorded in a recording part.

BEST MODE FOR CARRYING OUT THE INVENTION

Embodiment 1

Figure 1:
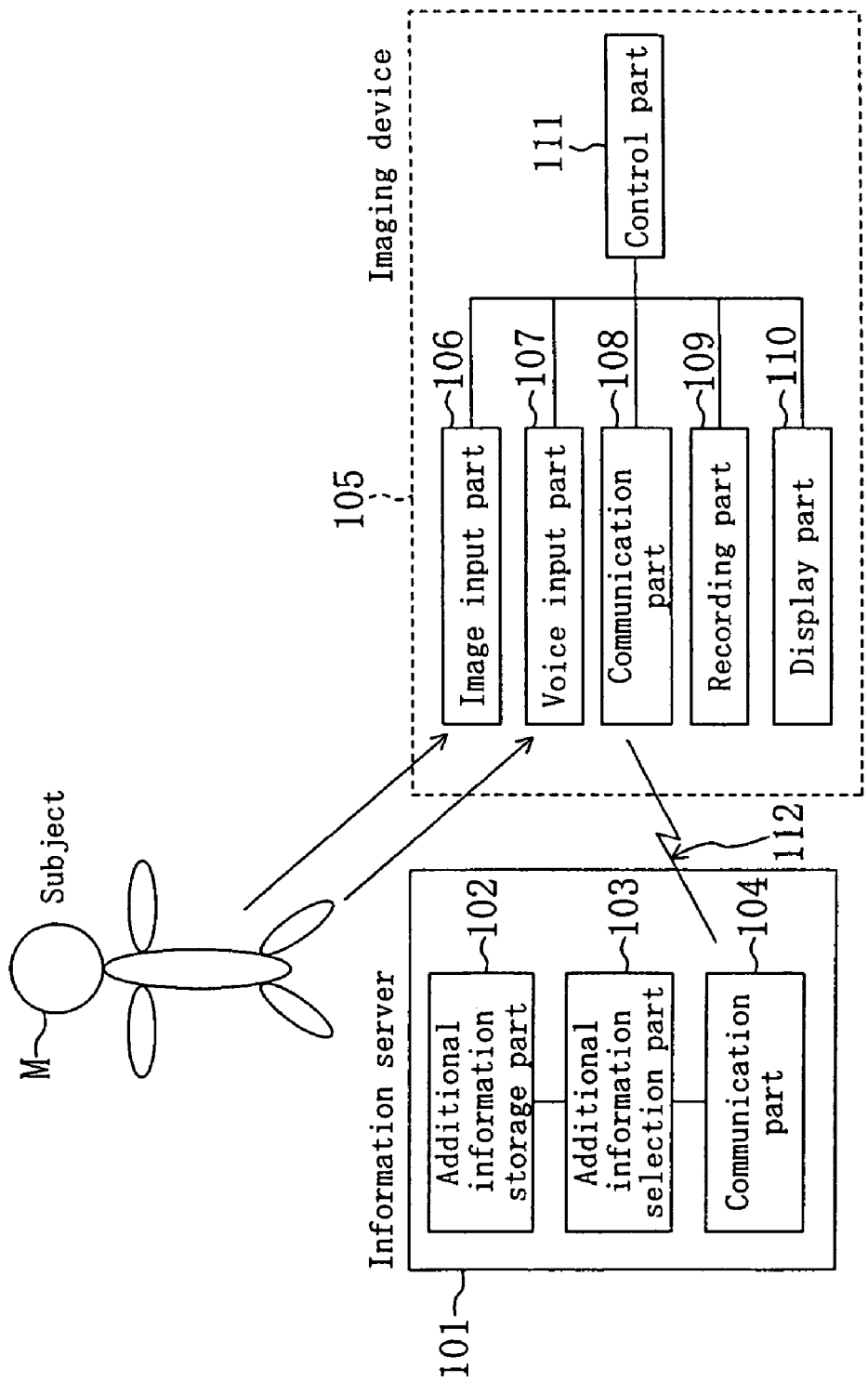
FIG. 1 is a block diagram for showing the architecture of a system according to Embodiment 1.

FIG. 1 is a block diagram of an information-added imaging system according to Embodiment 1. In this system, information about an event in which a plurality of event items are successively held with time is delivered to a user that is taking pictures with an imaging device 105. Thus, information necessary for the user can be provided to the user while he or she is taking pictures with the imaging device 105.

In this system, an information delivery device (information server) 101 and the imaging device 105 are mutually connected through a wireless and/or wire network line 112.

The information server 101 includes an addition information storage part 102, an additional information selection part 103 and a communication part 104.

The additional information storage part 102 stores additional information to be delivered to the imaging device 105. In this embodiment, the additional information storage part 102 stores information about the event.

The additional information selection part 103 appropriately selects information stored in the additional information storage part 102.

The communication part 104 sends/receives information through the network line 112. The communication part 104 mainly functions as a delivery part for delivering additional information selected by the additional information selection part 103 to the imaging device 105. The communication performed by this communication part 104 may utilize a public network. For example, a system (WAP (ezWeb: trademark) or i mode (trademark) for connecting a cellular phone (portable terminal) to the Internet may be utilized. Alternatively, a radio system for the PHS may be utilized. Furthermore, the communication part 104 may be a wireless parent device for sending information when a wireless child device is present within a given distance. The radio communication may be performed by a local radio system using, for example, Bluetooth (trademark). Alternatively, the radio communication may be performed by a radio system with directivity such as infrared-ray communication.

The imaging device 105 includes an image input part 106 and a voice input part 107 (imaging part) for capturing picture data of a subject M, a communication part 108, a recording part 109, a display part 110 and a control part 111 for controlling these parts. The imaging device 105 may be regarded as a general video camera additionally having a communication facility.

The communication part 108 sends/receives information through the network line 112. The communication part 108 mainly receives additional information delivered from the information server 101.

The recording part 109 records picture data captured by the image input part 106 and the voice input part 107. Specifically, it records the picture data in a recording medium such as a DVD or a video tape.

The display part 110 displays picture data captured by the image input part 106 and the voice input part 107. The display part 110 may be, for example, a viewfinder or a liquid crystal monitor.

The control part 111 adds additional information received by the communication part 108 to multimedia data (picture data) of the subject input from the image input part 106 and the voice input part 107, which will be described in detail later. Also, the control part 111 makes the display part 110 display picture data to which additional information has been added while picture data of the subject M is being captured. Furthermore, the control part 111 makes the recording part 109 record the picture data to which the additional information has been added.

Next, the flow of processing performed by the information-added imaging system will be described. Herein, the case where pictures of a sports meeting held in an elementary school are taken with the imaging device 105 will be exemplified for describing the flow of the processing performed by the information-added imaging system.

(Preparation Before Sports Meeting)

Before the sports meeting is started, information about the progress schedule of the sports meeting is stored in the additional information storage part 102 of the information server 101. The information about the progress schedule is information such as names of respective sport events (event items) held in the sports meeting and starting times of the respective sport events.

Also, not only the progress schedule of the sports meeting but also detailed information about the respective sport events is preferably stored in the additional information storage part 102. This detailed information is, for example, in a 80-meter race, information such as names of competitors scheduled to participate and their homerooms. Such information may be stored in the additional information storage part 102 in a hierarchical structure having the information about the name of a sport event in a higher layer and the detailed information about the sport event in a lower layer.

Furthermore, place information about the place of the sports meeting may be stored in the additional information storage part 102.

(Delivering Step and Receiving Step)

When the sports meeting is started, the additional information selection part 103 of the information server 101 first selects a program of the sports meeting stored in the additional information storage part 102. The communication part 104 of the information server 101 delivers the program of the sports meeting having been selected by the additional information selection part 103 to the imaging device 105.

The additional information selection part 103 selects information of the higher layer stored in the additional information storage part 102 in accordance with the progress of the sports meeting. For example, when a 80-meter race is currently held, the additional information selection part 103 selects information about "the 80-meter race". Also, the additional information selection part 103 selects information of the lower layer stored in the additional information storage part 102 in accordance with the progress of the sport event. Specifically, for example, when the names of competitors scheduled to participate the 80-meter race are stored as the information of the lower layer in the additional information storage part 102, information about competitors currently participating the 80-meter race (namely, currently running competitors) is successively selected.

The additional information selection part 103 may select information on the basis of the present time. This is effective when the sports meeting is progressing on time. When the sports meeting is not progressing on time, the additional information selection part 103 may select information in accordance with the operation of an operator. In other words, an operator may specify information to be selected in accordance with the progress of the sports meeting.

Every time the additional information selection part 103 selects information, the communication part 104 of the information server 101 delivers the selection information to the imaging device 105. In this manner, the information server 101 is constructed to perform push information delivery for delivering information in accordance with the progress of the event in which a plurality of event items are successively held with time, that is, the sports meeting in this embodiment.

The additional information thus delivered from the information server 101 in accordance with the progress of the sports meeting is received by the communication part 108 of the imaging device 105.

(Imaging Step and Displaying Step)

When the communication part 108 receives the additional information, the control part 111 of the imaging device 105 adds the additional information to picture data input by the image input part 106 and the voice input part 107. Also, while picture data is being captured, the control part 111 makes the display part 110 display picture data to which additional information has been added.

Figure 2:
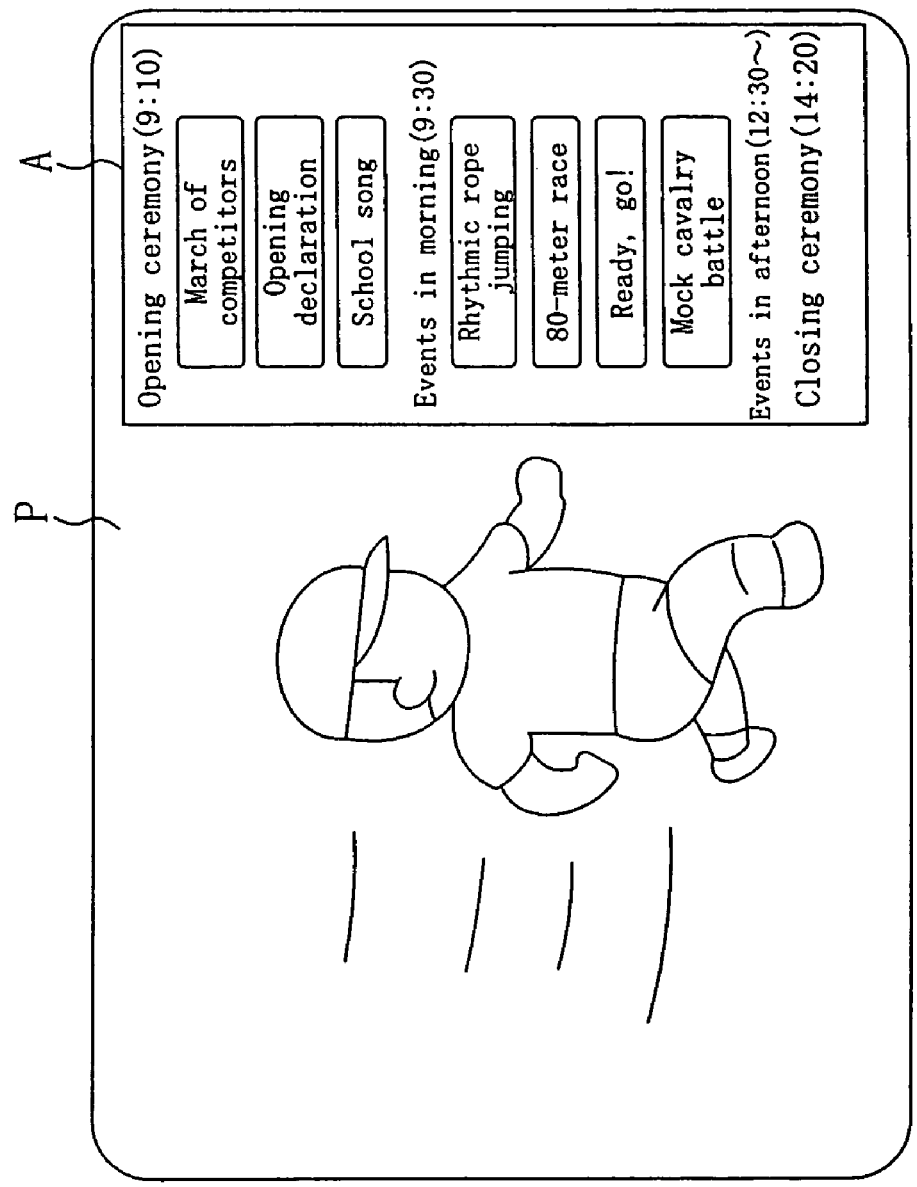
FIG. 2 is a diagram for exemplifying a screen structure for displaying picture data.

In this manner, as exemplified in FIG. 2, the display part 110 of the imaging device 105 displays a screen in which a program A of the sports meeting having been delivered from the information server 101 is added to picture data P input by the image input part 106 and the voice input part 107. It is noted that this program A can be text data.

Figure 3:
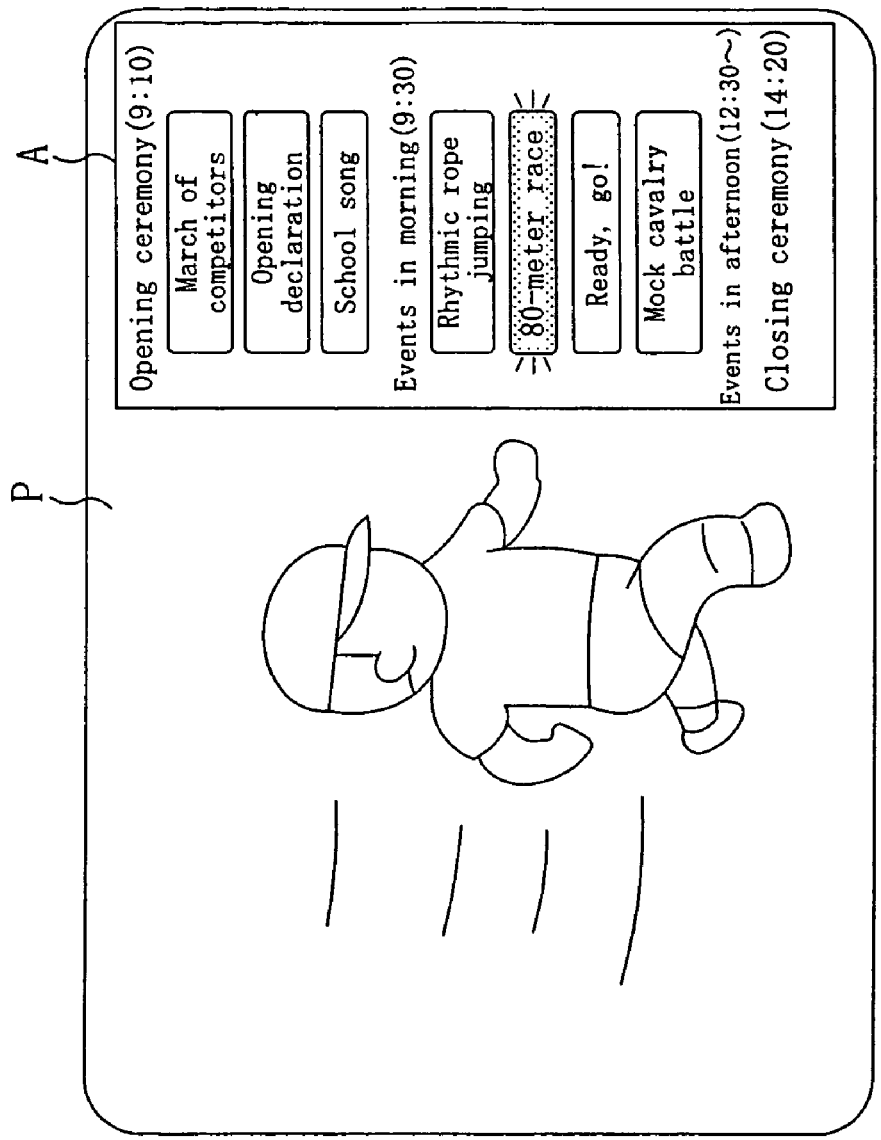
FIG. 3 is a diagram of a screen displayed when information in accordance with the progress of an event is delivered.

Also, when information about a currently held sport event is delivered from the information server 101 in accordance with the progress of the sports meeting, the control part 111 updates the additional information to be added to the picture data. Thus, for example, as shown in FIG. 3, among the names of sport events included in the program A in the screen displayed on the display part 110, the name of the currently held sport event (which is "the 80-meter race" in the drawing) is inverted. In this manner, the user that is taking pictures with the imaging device 105 can find which sport event is now being shot.

Figure 4:
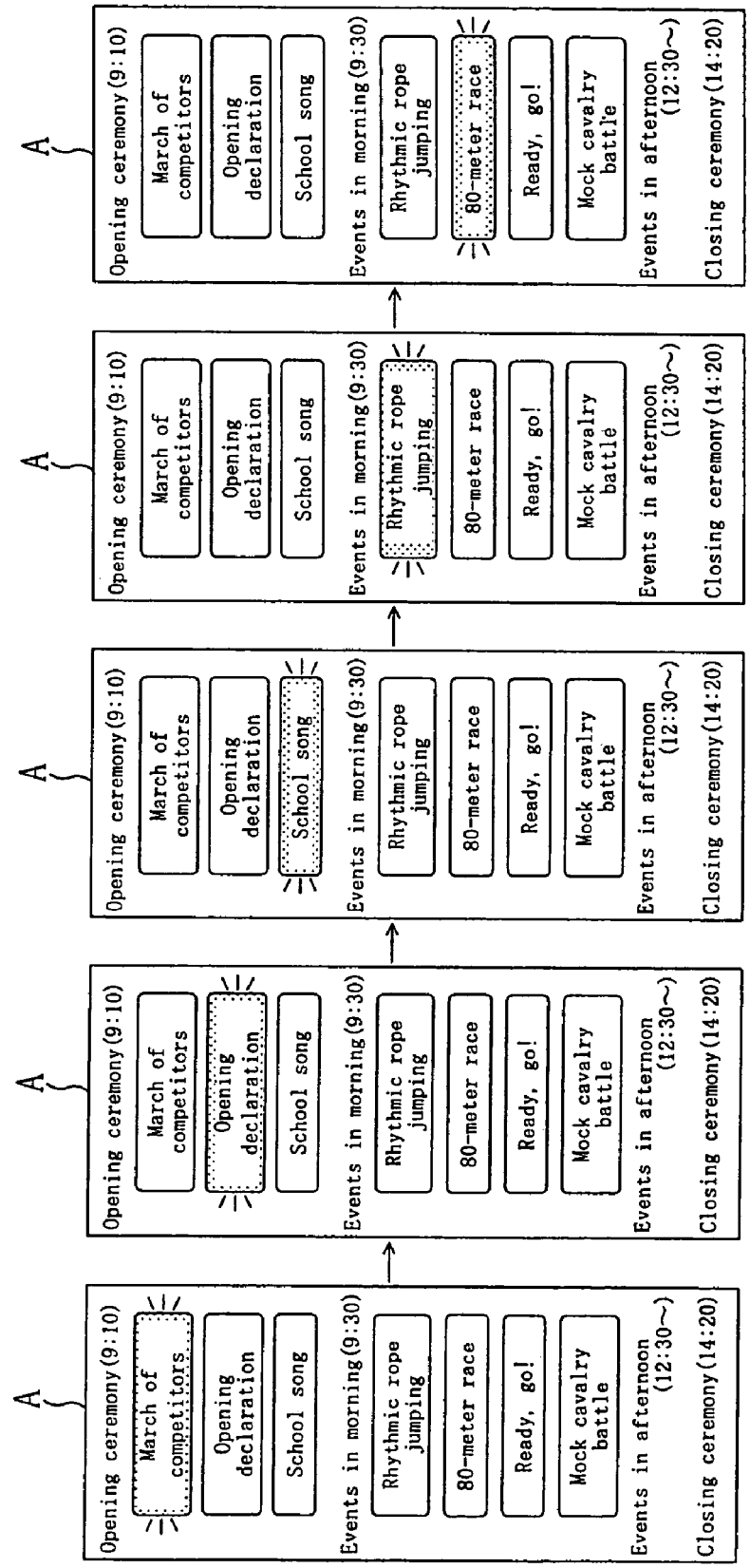
FIG. 4 is an explanatory diagram for exemplifying change of a screen displayed when information in accordance with the progress of an event is successively delivered.

Furthermore, the control part 111 updates the additional information to be added to the picture data every time additional information is delivered from the information server 101. Therefore, in the screen displayed on the display part 110, the names of the sport events included in the program A are successively inverted as shown in FIG. 4.

In the screen displayed on the display part 110, portions of the names of the respective sport events included in the program A are constructed as selection buttons.

Figure 5:
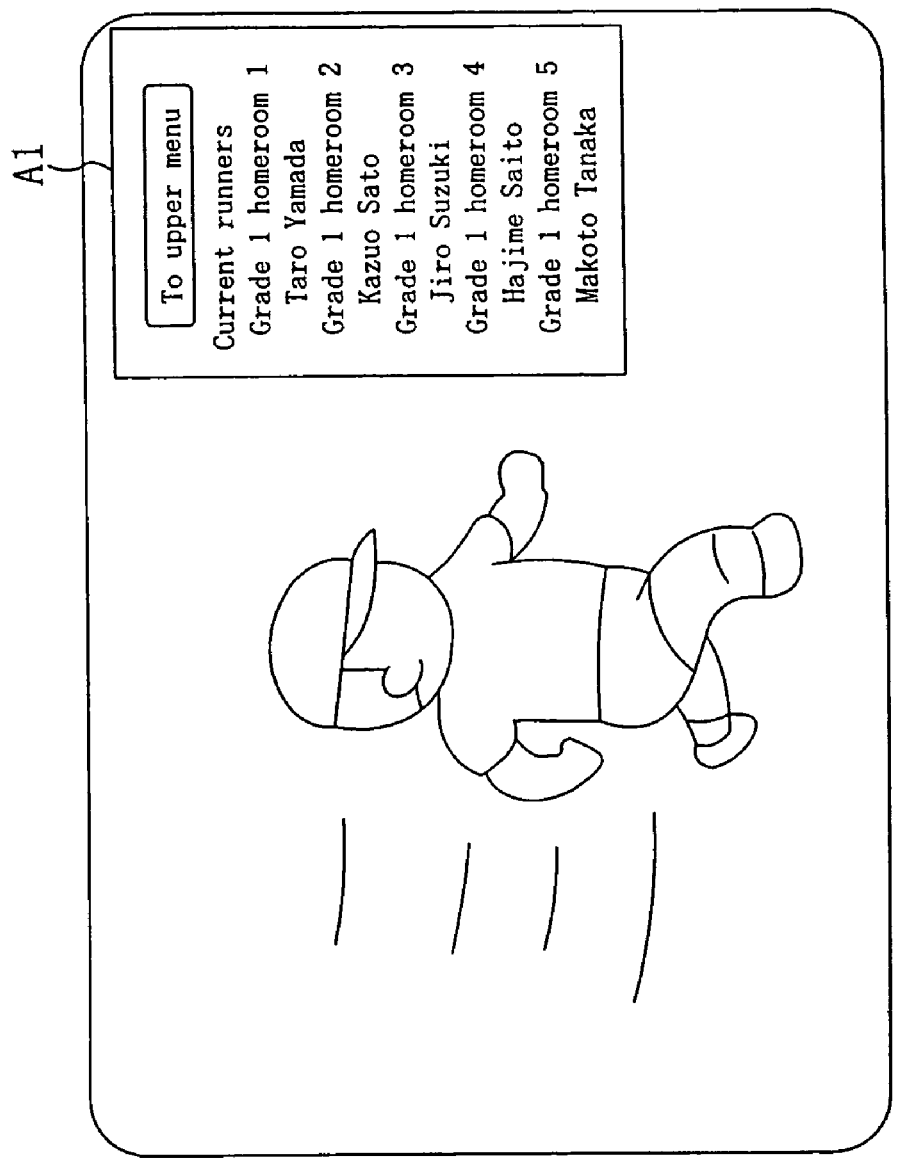
FIG. 5 is a diagram for exemplifying a screen for displaying additional information of a lower layer.

When the user selectively operates a selection button corresponding to an inverted name of a sport event, detailed information A1 of the sport event is displayed on the display part 110 as shown in FIG. 5. In this exemplified drawing, with respect to the currently held "80-meter race", information about names and homerooms of competitors currently participating are displayed. In this manner, even when the faces of the currently running competitors cannot be identified because of a large distance from the subject, the user can recognize which competitors are now running and hence never loses an opportunity to take a desired picture.

In this system, the additional information is constructed to have the hierarchical structure, and picture data to which additional information of a specified layer has been added is displayed on the display part 110 in accordance with the specification made by the user.

The information server 101 may deliver such information of the lower layer by the push method in accordance with the progress of the sports meeting. In other words, the information server 101 may deliver information of the lower layer to the imaging device 105 in accordance with change of competitors every time competitors change. In this case, the imaging device 105 temporarily stores the delivered information of the lower layer (information about the names of the competitors) and displays the temporarily stored information of the lower layer when the user selectively operates a selection button in the screen displayed on the display part 110.

Alternatively, the information server 101 may deliver the information of the lower layer in a pull method. In other words, when the user selectively operates a selection button in the screen displayed on the display part 110, the imaging device 105 makes a delivery request for information of the lower layer to the information server 101. The information server 101 may deliver the information of the lower layer (information about the names of currently participating competitors) in response to this delivery request.

It is noted that information that cannot be previously stored in the additional information storage part 102 of the information server 101, such as information about the result of a sport event, may be delivered to the imaging device 105. Specifically, after a sport event is completed, an operator manually inputs the result of the sport event in the information server 101. The communication part 104 of the information server 101 delivers the input information. Thus, the result of the sport event can be recorded together with picture data in a subsequent recording step.

Furthermore, information about a place suitable for taking pictures may be delivered to the imaging device 105. For example, when information about a currently held sport event is delivered from the information server 101 in accordance with the progress of the sports meeting, information about a place suitable for shooting the sport event may be delivered together. Thus, the user can take pictures of the sport event in an optimum place in accordance with the information.

(Recording Step)

When the user operates to start recording of picture data, the control part 111 of the imaging device 105 makes the recording part 109 record image and voice information (picture data) to which additional information has been added. For example, the image and voice information may be recorded in a format of MPEG or the like and the additional information may be recorded as tag information. The additional information may be recorded correspondingly to a frame number of MPEG data. In this manner, information that data from a frame ○○ to a frame ×× is data of "the 80-meter race" can be recorded. It is noted that the additional information may be recorded correspondingly to time information instead of the frame number.

In recording the picture data in the recording part 109, information about a place where the picture data is captured may be further added to the picture data for recording. The information about the place may be obtained by using that stored in the additional information storage part 102 of the information server 101. Alternatively, when the imaging device 105 is applicable to the GPS, information about the place may be obtained by using it.

Furthermore, in recording the picture data in the recording part 109, time information at which the picture data is captured may be further added to the picture data for recording.

(Reproducing step)

A reproduce screen for the picture data having been recorded in the recording part 109 in the aforementioned recording step is shown in FIG. 3. Since the picture data is recorded with the additional information added, the reproduce screen includes the picture data (image information and voice information) and the additional information. In other words, the reproduce screen for recorded picture data is in substantially the same structure as the screen displayed on the display part 110 when it is captured. In this manner, since the screen in the same structure as the reproduce screen is displayed on the display part 105 of the imaging device 105 in taking pictures in this system, the user can take a picture of the subject M with the composition determined in consideration of the position of the additional information on the screen.

In the reproduce screen, among the names of the sport events included in the program A, the name of the sport event corresponding to the picture data currently reproduced is inverted. In this exemplified drawing, since the picture data currently reproduced corresponds to the 80-meter race, the "80-meter race" is inverted in the program A. Therefore, although the program of the sports meeting should be conventionally referred to for corresponding picture data currently reproduced to the name of the sport event because the picture data corresponds to time of the capture, the user can easily determine which sport event corresponds to picture data currently reproduced because the picture data corresponds to the name of the sport event in this embodiment.

Furthermore, in the reproduce screen, portions of the names of the sport events included in the program A are constructed as selection buttons. When the user selectively operates the selection button of any of the names of the sport events, the picture data of the selected sport event is started to reproduce. Thus, the reproduce screen is provided with an interface for finding the head of each picture data, and therefore, the user can immediately see picture data of a desired sport event.

Moreover, for example, in the program A on the reproduce screen, the names of sport events corresponding to the picture data recorded in the recording part 109 may be displayed so as to be distinguishable from the name of a sport event not recorded in the recording part 109. Thus, the user can easily check which sport events of the sports meeting are recorded in the recording part 109.

(Reserving Step)

In the case where pictures of an event in which a plurality of event items are successively held with time like the sports meeting are taken, the user may desire to record not all the event items held in the event but a specific event item alone. Therefore, in this system, the user is informed of start of the event item he or she desires to record at a timing that the event item is started.

Specifically, for example, before or during the sports meeting, reservation is made from the imaging device 105 in the information server 101 through the network line 112. In other words, a request is made to inform the user at a timing that a specified event item is to be held. This reservation may be made by specifying the name of the sport event or by specifying a keyword (such as the name of a competitor).

It is noted that this reservation may be made not from the imaging device 105 but from a device other than the imaging device 105 through the network line 112 (or another communication line). Alternatively, the reservation may be made by directly operating the information server 101.

The additional information selection part 103 of the information server 101 selects information in the additional information storage part 102 in accordance with the content of the reservation. Specifically, when the name of a sport event is specified, the additional information selection part 103 selects the information about the specified sport event. Alternatively, when a keyword is specified, the additional information selection part 103 selects information corresponding to the keyword (such as a sport event in which a specified competitor participates).

The communication part 104 of the information server 101 informs the imaging device 105 of the start of the sport event at a timing that the sport event selected by the additional information selection part 103 is to be held. Furthermore, when a competitor is specified in making the reservation, the communication part 104 informs the imaging device 105 of the participation of the competitor at a timing that the competitor is to participate.

Figure 6:
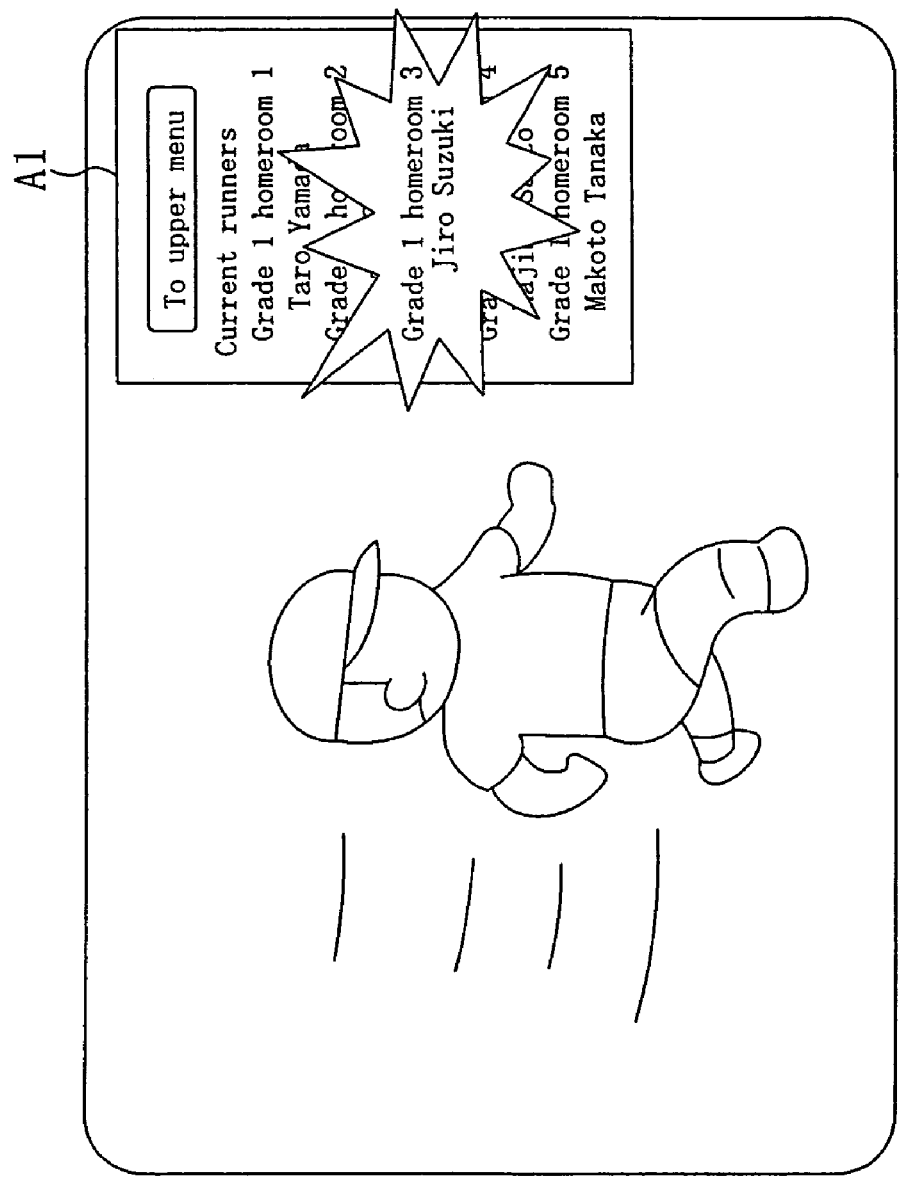
FIG. 6 is a diagram for exemplifying a screen displayed when information is delivered in accordance with reservation.

When the control part 111 of the imaging device 105 receives the information from the information server 101, it adds the information to picture data. Then, the control part 111 makes the display part 110 display the picture data to which the information has been added. For example, as shown in FIG. 6, the information may be highlighted. Thus, the user can recognize that the reserved sport event is to be started, so as to definitely record data of the desired sport event.

(Modification 1)

In the aforementioned embodiment, the program A is displayed in the screen displayed on the display part 110 of the imaging device 105, so that the names of currently held sport events can be successively inverted among the names of the sport events included in the program A.

Instead, a screen displayed on the display part 110 may have a structure in which a program B including a currently held sport event and preceding and following sport events alone is displayed in accordance with the progress of the sports meeting.

This may be realized by, for example, the information server 101 appropriately manipulating information to be delivered. In other words, when the additional information selection part 103 of the information server 101 selects information about a currently held sport event, the communication part 104 may deliver the selected information about the sport event and information about preceding and following sport events to the imaging device 105. In this case, the control part 111 of the imaging device 105 may directly add the delivered additional information to picture data.

Alternatively, the aforementioned screen structure may be realized by, for example, the imaging device 105 appropriately manipulating additional information to be added to picture data on the basis of delivered information. In other words, when information about a currently held sport event is delivered from the information server 101, the control part 111 of the imaging device 105 creates additional information by extracting the currently held sport event and preceding and following sport events on the basis of the delivered information and the program of the sports meeting. Then, the created additional information is added to picture data.

Figure 8:
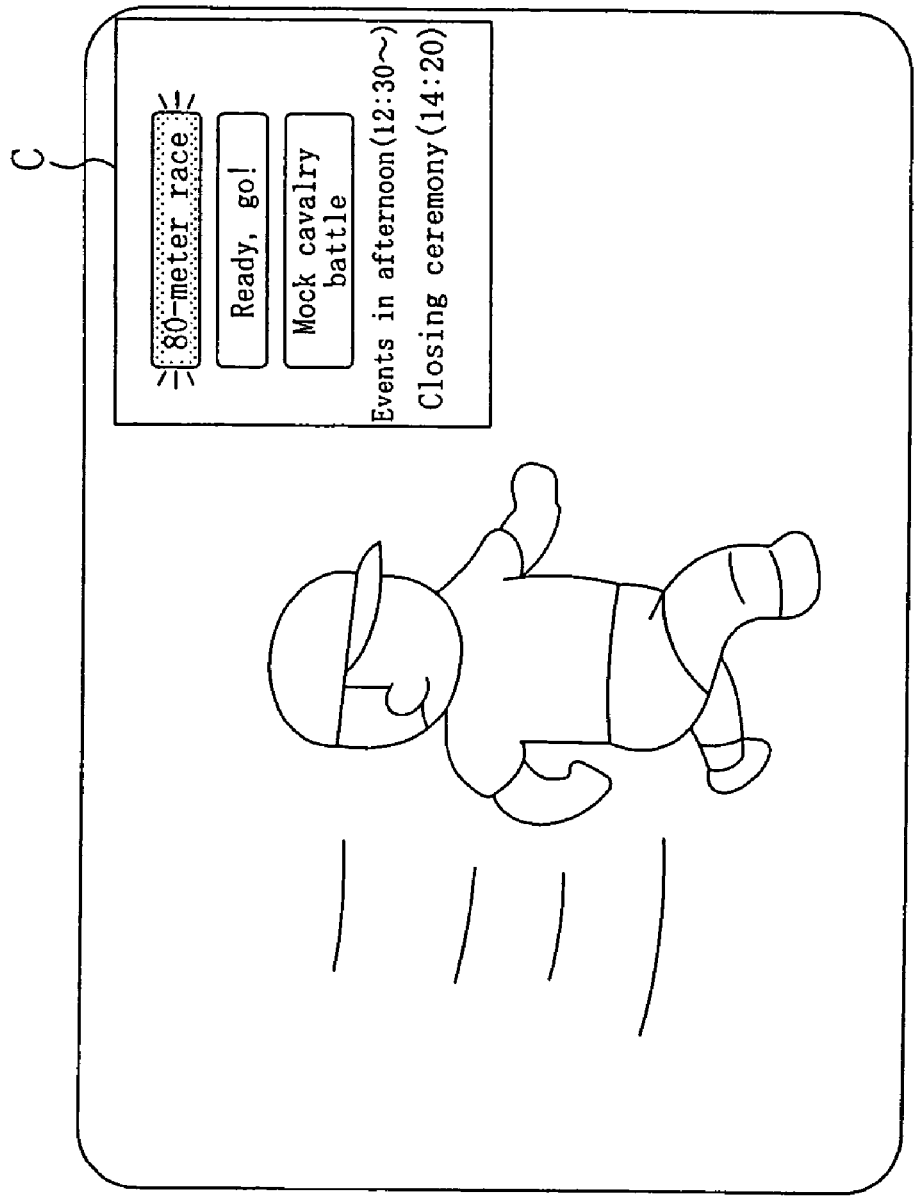
FIG. 8 is a diagram of a screen structure different from those of FIGS. 3 and 7.

Also, the screen displayed on the display part 110 may have a structure, for example, as shown in FIG. 8 in which a program C including a currently held sport event and following sport events alone is displayed in accordance with the progress of the sports meeting.

Figure 7:
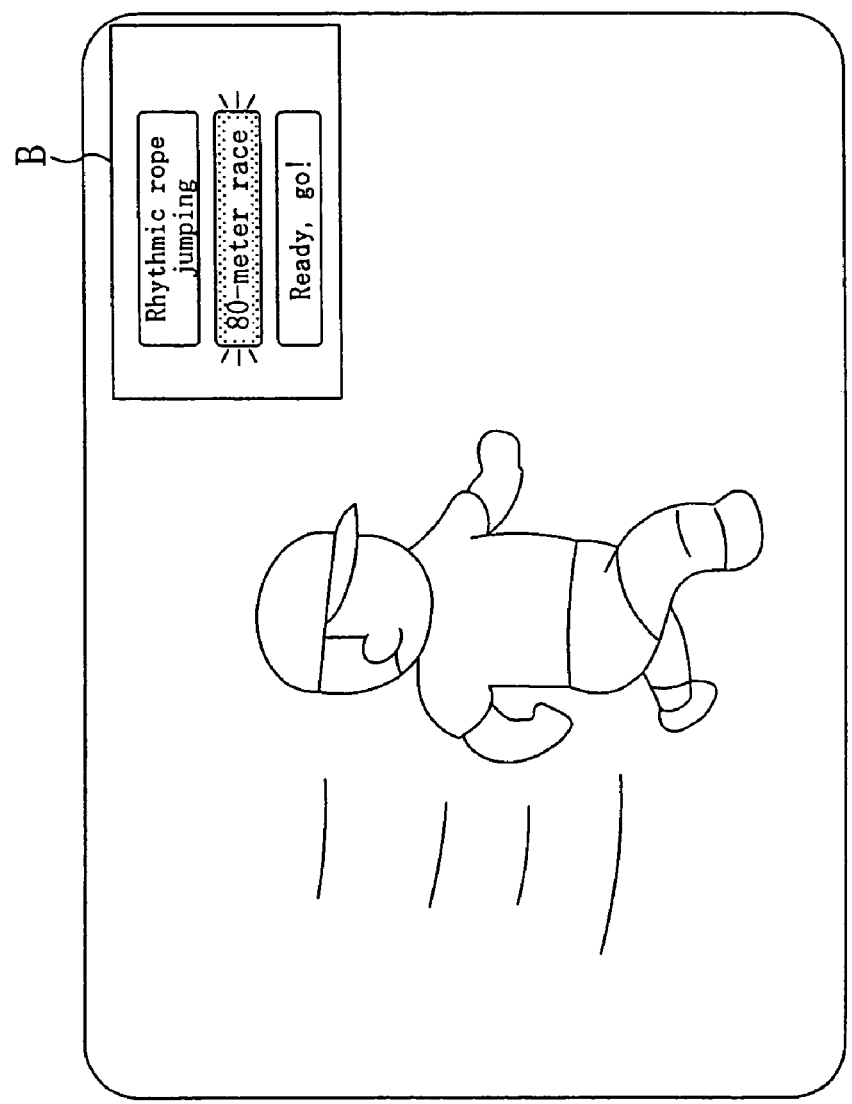
FIG. 7 is a diagram of a screen structure different from that of FIG. 3.

It is noted that, with the respective screen structures of FIG. 3, FIG. 7 and FIG. 8 provided to be arbitrarily selectable by the user, the screen structure to be displayed on the display part 110 may be switched in accordance with selection made by the user.

(Modification 2)

Although the information server 101 performs the push information delivery in the aforementioned embodiment, the information server 101 may be, for example, a Web server for performing pull information delivery for delivering information in response to a request from the imaging device 105.

However, in delivering information about an event in which a plurality of event items are successively held with time, the information is preferably delivered in accordance with the progress of the event. Therefore, the system may be constructed so that the imaging device 105 can poll the information server 101 so as to perform pseudo push information delivery. For example, the control part 111 of the imaging device 105 may allow the communication part 108 to make information delivery requests at given time intervals. Alternatively, the communication part 108 itself may make information-delivery requests at given time intervals. A polling program may be previously provided to the imaging device 105 or may be properly downloaded from the information server 101.

Alternatively, the system may be constructed in such a manner that a device other than the imaging device 105 makes information delivery requests to the information server 101 (for example, at given time intervals) so that the information server 101 can deliver information to the imaging device 105.

(Modification 3)

Although the additional information delivered by the information server 101 is text data (such as the program of the sports meeting) in the aforementioned embodiment, the additional information is not limited to the text data but image data or the like can be delivered as the additional information. However, image data has a comparatively large size and hence the information delivery may be difficult. Therefore, instead of delivering the image data itself, a URL of the Internet for specifying the image data may be delivered instead. The control part 111 of the imaging device 105 adds the delivered URL to the image data as the additional information. The recording part 109 records the picture data to which the URL has been added.

In this case, the recorded picture data is preferably reproduced on a reproducing terminal capable of connecting to the Internet. The reproducing terminal may be the imaging device 105. Thus, in reproducing the picture data, the reproducing terminal acquires the image data specified by the URL through the Internet, so as to reproduce the picture data with the acquired image data added.

This can be used, for example, in the case where image data of a practice scene of a dance or mass games, that is, one of the sport events held in the sports meeting, is provided to the user so that the user can enjoy the practice scene.

Furthermore, in the case where the additional information to be added to the picture data is information daily updated, the information server 101 delivers a URL for specifying the information. Thus, in reproducing the picture data, the reproducing terminal acquires the information specified by the URL through the Internet, so as to reproduce the picture data with adding the information latest at the time of reproducing.

Embodiment 2

Figure 9:
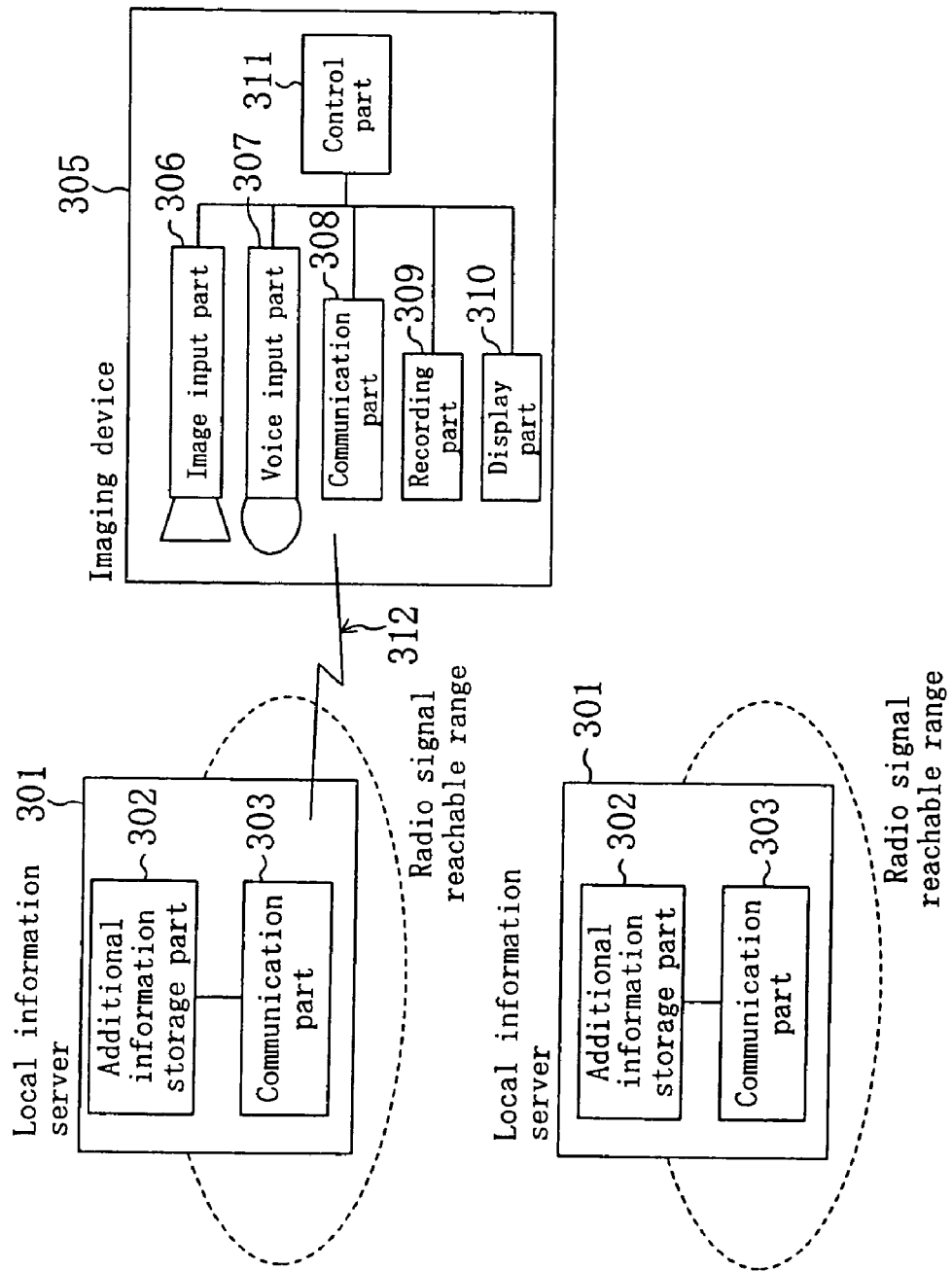
FIG. 9 is a block diagram for showing the architecture of a system according to Embodiment 2.

FIG. 9 is a block diagram of an information-added imaging system according to Embodiment 2. This system is constructed as a system to be provided in, for-example, a sight-seeing resort having a plurality of tourist spots.

Specifically, in a sight-seeing resort, each tourist spot occasionally has an information board for providing explanation about the tourist spot. A picture may be taken with an imaging device with the tourist spot as the background, so as to record picture data. Conventionally, however, even when the picture data of the tourist spot is recorded, the explanation about the tourist spot is not recorded. Therefore, in reproducing the recorded picture data later, the explanation of the tourist spot cannot be checked.

Therefore, in this system, a local information server 301 is provided to each tourist spot so that information about the tourist spot can be delivered to an imaging device 305 while pictures are being taken with the imaging device 305. In this manner, while a user is taking pictures with the imaging device 305, information necessary for the user can be provided.

Specifically, in this system, a plurality of information delivery devices (local information servers) 301 installed away from one another are respectively connected to an imaging device 305 through a wireless and/or wire network line 312.

Each local information server 301 includes an additional information storage part 302 and a communication part 303 for delivering information stored in the additional information storage part 302 through the network line 312.

The additional information storage part 302 stores additional information according to a place where the corresponding local information server 301 is installed. For example, in the case where the system is provided in a sight-seeing resort, the additional information storage part 302 of each local information server 301 stores information about a tourist spot where the local information server 301 is installed.

The communication part 303 may be a wireless parent device for sending information when a wireless child device is present within a given range. This radio communication may be performed by a local radio method using, for example, Bluetooth (trademark). Alternatively, the radio communication may be performed by a radio method with directivity such as infrared-ray communication.

The imaging device 305 includes an image input part 306, a voice input part 307, a communication part 308, a recording part 309, a display part 310 and a control part 311 for controlling these parts. This may be regarded as a general video camera additionally having a communication facility.

The communication part 308 is a wireless child device for receiving additional information delivered from the local information server 301.

The recording part 309 records picture data input by the image input part 306 and the voice input part 307.

The display part 310 displays the picture data input by the image input part 306 and the voice input part 307.

The control part 311 adds the additional information received by the communication part 308 to the picture data of a subject input by the image input part 306 and the voice input part 307, which will be described in detail later. Also, while pictures of the subject are being taken, the control part 311 makes the display part 310 display picture data to which additional information has been added. Furthermore, the control part 311 makes the recording part 309 record the picture data to which the additional information has been added.

Next, the flow of the processing performed by the information-added imaging system will be described. In this embodiment, a system provided in a sight-seeing resort will be exemplified for describing the flow of the processing performed by the information-added imaging system.

(Delivering Step and Receiving Step)

When a user with the imaging device 305 arrives at a tourist spot, the imaging device 305 enters the signal reachable range of the local information server 301. When radio communication between the local information server 301 and the imaging device 305 is established, the communication part 303 of this local information server 301 delivers additional information stored in the additional information storage part 302 to the imaging device 305. In other words, information about the tourist spot corresponding to the place of the local information server 301 is delivered from the local information server 301 to the imaging device 305.

The additional information delivered from the local information server 301 in this manner is received by the communication part 308 of the imaging device 305.

(Imaging Step and Displaying Step)

When the communication part 308 receives the additional information, the control part 311 of the imaging device 305 adds the additional information to picture data input by the image input part 306 and the voice input part 307. Also, while picture data is being captured by the image input part 306 and the voice input part 307, the control part 311 makes the display part 310 display picture data to which additional information has been added.

Figure 10:
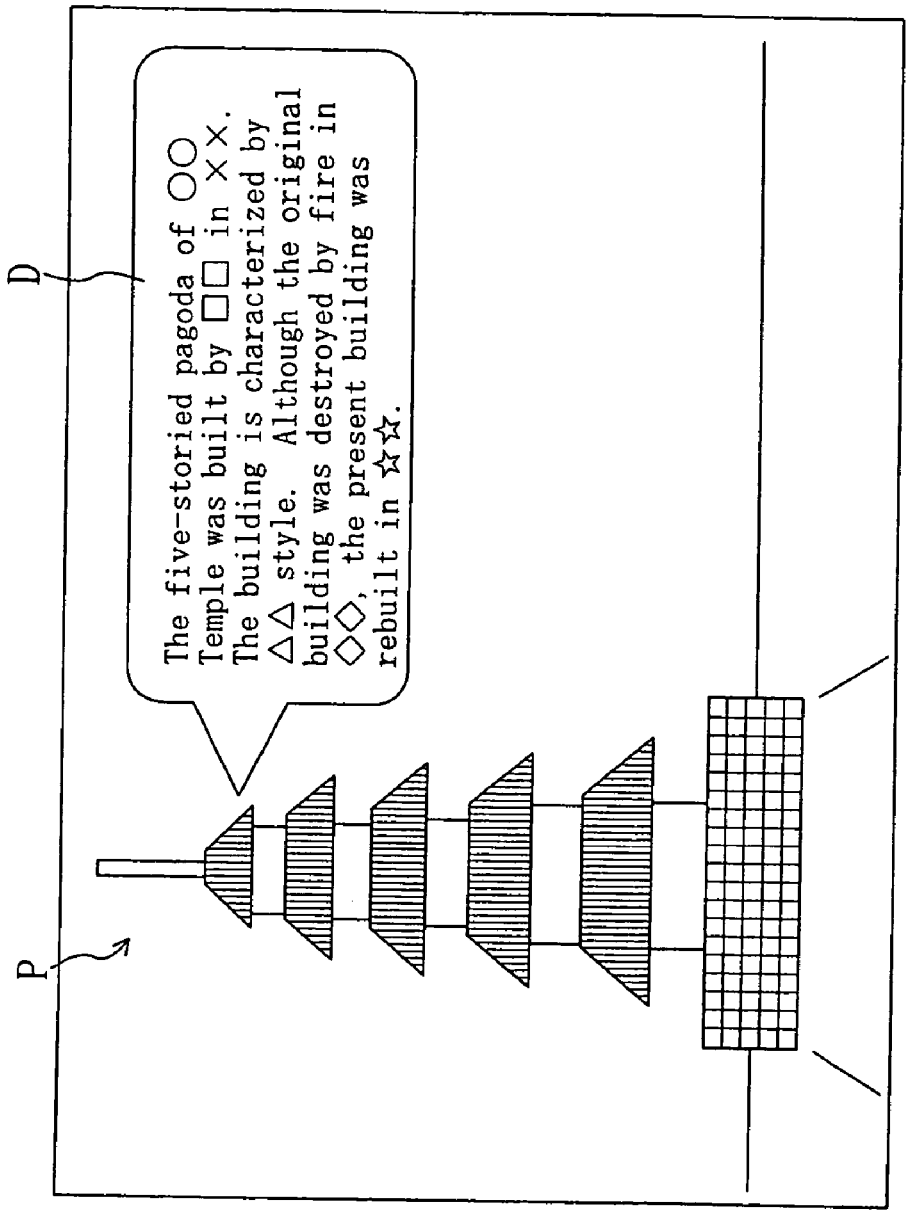
FIG. 10 is a diagram for exemplifying a screen structure for displaying picture data.

In this manner, as exemplified in FIG. 10, the display part 310 of the imaging device 305 displays a screen in which additional information D delivered from the local information server 301 has been added to picture data P. In the exemplified drawing, the screen has a structure in which the explanation D (text data) of a five-storied pagoda is superimposed on the picture data P of the five-storied pagoda.

Since the explanation D is displayed on the display part 310 of the imaging device 305 in this manner, the user can determine the composition so that the explanation D may not overlap the subject.

Furthermore, information about a position suitable to take a picture of the subject may be delivered to the imaging device 105 together with the explanation of the tourist spot. In this manner, the user can take a picture of the subject in an optimum position according to the information.

It is noted that the position of the explanation D in the screen may be specified by the user.

Although the screen has the structure in which the explanation D is superimposed on the picture data P in the exemplified drawing, the screen may have a structure in which it is divided into upper and lower areas or right and left areas so as to display the picture data P in one area and display the explanation D in the other.

(Recording Step)

When the user operates to start recording of picture data, the control part 311 of the imaging device 305 makes the recording part 309 record image and voice information (picture data) to which additional information has been added.

In recording the picture data in the recording part 309, information about a place where the picture data is captured may be further added to the picture data to be recorded. The information about the place may be provided by the local information server 301. Alternatively, when the imaging device 305 is applicable to the GPS, information about the place may be obtained by using it.

Furthermore, in recording the picture data in the recording part 309, time information at which the picture data is captured may be further added to the picture data to be recorded.

In this manner, in this system, in taking pictures of the tourist spot with the imaging device 305, the information about the tourist spot is provided to the user.

Therefore, the user can record data of all sights desired to record, such as places of scenic beauty and historic interest, on the basis of the information.

(Reproducing Step)

A reproduce screen of the picture data recorded in the recording part 309 in the aforementioned recording step is shown in FIG. 10. This reproduce screen is substantially the same as the screen displayed on the display part 310 of the imaging device 305 in capturing the data. This reproduce screen includes the picture data P (image information and voice information) and the explanation D. Thus, also in reproducing the picture data, the user can check the information about the tourist spot.

It is noted that the imaging device 305 may be served for a rental with a charge in a sight-seeing resort where this system is constructed. Thus, a user can easily record picture data including the explanation of each tourist spot by using the rental imaging device 305.

Furthermore, this system is applicable to, instead of the imaging device 305, a portable terminal including a communication part, a display part and a control part. In other words, when the portable terminal enters the signal reachable range of the local information server 301, the local information server 301 delivers explanation information bout the corresponding tourist spot to the portable terminal in the same manner as described above. When the communication part of the portable terminal receives the delivered information, the control part makes the display part display the information. In this manner, when a user with the portable terminal comes near to each tourist spot, information about the tourist spot is automatically displayed on the portable terminal.

Embodiment 3

Figure 11:
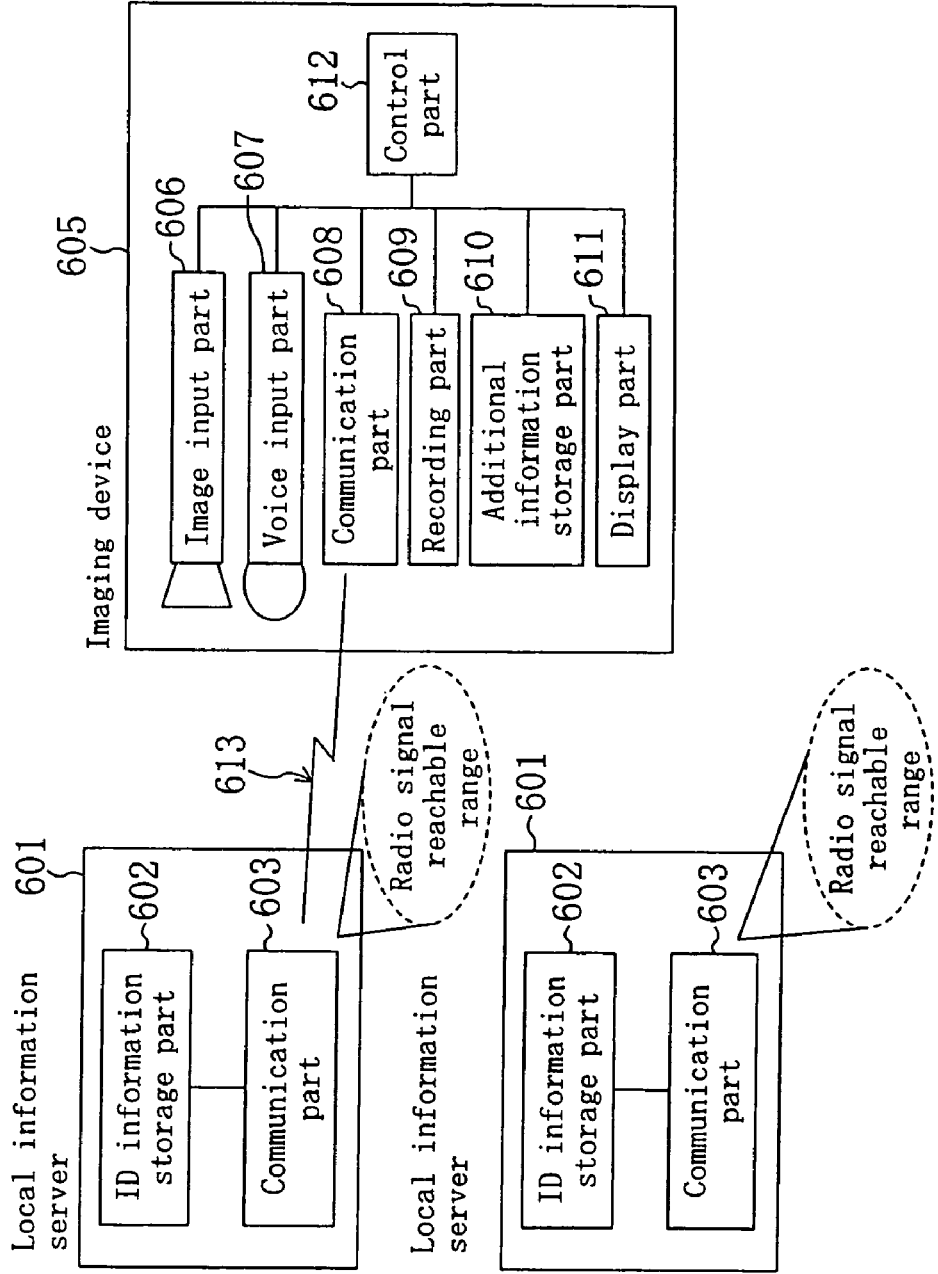
FIG. 11 is a block diagram for showing the architecture of a system according to Embodiment 3.

FIG. 11 is a block diagram of a system according to Embodiment 3. This system is constructed as a system to be provided in, for example, a zoo or an aquarium.

For example, in a zoo, there is sometimes a signboard for explaining an animal in front of a cage for keeping the animal. In some cases, the signboard is provided with a button that is to be pushed for reproducing a roar or a bark of the animal. Conventionally, however, even when picture data of the animal is recorded, the explanation and the roar or bark of the animal are not recorded. Therefore, when the picture data is reproduced later, the explanation of the animal cannot be checked.

Accordingly, in this system, a local information server 601 is installed correspondingly to each of cages of animals so that information about the corresponding animal can be displayed in an imaging device 605 when a user is taking a picture of the animal with the imaging device 605. Thus, while the user is taking pictures with the imaging device 605, information necessary for the user is provided.

Specifically, in this system, a plurality of information delivery devices (local information servers) 601 installed away from one another are respectively connected to the imaging device 605 through a wireless and/or wire network line 613.

Each local information server 601 includes an ID information storage part 602 and a communication part 603 for delivering information stored in the ID information storage part 602 through the network line 613.

The ID information storage part 602 stores ID information (an ID number) set correspondingly to a place where the local information server 601 is installed. For example, when the system is provided in a zoo, the ID information storage part 602 of each local information server 601 stores ID information assigned to an animal kept in a cage corresponding to the local information server 601.

The communication part 303 may be a wireless parent device using a radio method with directivity such as infrared-ray communication for sending information when a wireless child device is present within a given range. This radio communication may be performed by a local radio method using, for example, Bluetooth (trademark).

The imaging device 605 includes an image input part 606, a voice input part 607, a communication part 608, a recording part 609, an additional information storage part 610 for storing additional information, a display part 611 and a control part 612.

The communication part 608 is a wireless child device for receiving additional information delivered from the local information server 601.

The recording part 609 records picture data input by the image input part 606 and the voice input part 607.

The additional information storage part 610 is removably provided on the imaging device 605. Specifically, it may be a memory card. In this additional information storage part 610, various additional information is stored correspondingly to each ID number.

The display part 611 displays the picture data input by the image input part 606 and the voice input part 607.

The control part 612 selects additional information stored in the additional information storage part 610 on the basis of ID information received by the communication part 608 and adds the selected additional information to picture data of a subject input by the image input part 606 and the voice input part 607, which will be described in detail later. Also, while pictures of the subject are being taken, the control part 612 makes the display part 611 display picture data to which additional information has been added. Furthermore, the control part 612 makes the recording part 609 record the picture data to which the additional information has been added.

This imaging device 605 may be regarded as a general video camera additionally having a communication facility to which a memory card is removably provided.

Next, the flow of processing performed by the information-added imaging system will be described. In this embodiment, a system provided in a zoo is exemplified so as to described the flow of the processing performed by the information-added imaging system.

Figures 12, 13:
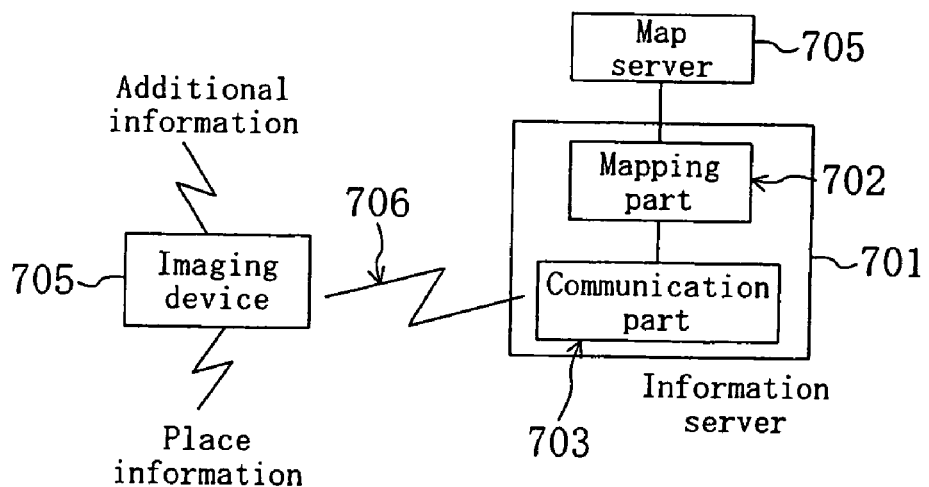
FIG. 12 is a diagram for exemplifying a data structure of information stored in an additional information storage part.
FIG. 13 is a block diagram for showing the architecture of a system according to Embodiment 4.

The additional information storage part 610 stores information about each animal that can be observed in the zoo. FIG. 12 shows an example of a data structure of the additional information stored in the additional information storage part 610. In this data structure, an ID number is corresponded to voice data and image data. The ID number is used for specifying an animal, and respective animals have different numbers. In the exemplified drawing, an ID number "1" corresponds to an "elephant". Also, data "Elephant.wav" corresponding to the ID number "1" is voice data in which a roar of an elephant is recorded. Similarly, data "Elephant.mpg" corresponding to the ID number "1" is image data in which an ordinary condition for keeping an elephant or growing stages of an element is recorded.

Although the additional information storage part 610 stores the voice data and the image data in this embodiment, explanation of each animal (a text data) may be stored correspondingly to an ID number in the additional information storage part 610.

This additional information storage part (memory card) 610 may be given to a visitor with or without a charge, for example, at the entrance of the zoo.

(Delivering Step and Receiving Step)

When a user with the imaging device 605 arrives at the front of a cage of an animal, the imaging device 605 enters the signal reachable range of the local information server 601. When radio communication between the local information server 601 and the imaging device 605 is established, the communication part 603 of this local information server 601 delivers ID information stored in the ID information storage part 602 to the imaging device 605.

The ID information (selection information) delivered from the local information server 601 in this manner is received by the communication part 608 of the imaging device 605.

(Imaging Step and Displaying Step)

When the communication part 608 receives the ID information (ID number), the control part 612 of the imaging device 605 reads data (additional information) corresponding to the ID number from the additional information stored in the additional information storage part 610. For example, when the received ID number is "1", the data "Elephant.wav" and "Elephant.mpg" corresponding to the number are read (see FIG. 12).

Then, the control part 612 adds the read additional information to picture data input by the image input part 606 and the voice input part 607. Also, while picture data is being captured with the image input part 606 and the voice input part 607, the control part 612 makes the display part 611 display picture data to which additional information has been added. Although an example of a screen displayed on the display part 611 at this point is herein omitted, a screen structure in which the picture data and the additional information (image data) are superimposed, for example, as shown in FIG. 10 may be employed. In other words, although the additional information is text data in the screen shown in FIG. 10, the text data may be replaced with image data. Also, the voice data of the additional information is reproduced with, for example, a loudspeaker.

In this manner, the display part 611 of the imaging device 605 displays the picture data (subject) and the additional information, and therefore, the user can determine the composition so that the additional information may not overlap the subject. Also, since a picture is taken in view of the image data of the additional information, a picture of the subject can be taken in the same position as the position in which the image data is captured. Thus, a picture comparably with the image data of the additional information can be taken.

Also, in this system, the additional information to be added to the picture data is image and voice data, which have a comparatively large size, but the ID information alone is delivered from the local information server 601 to the imaging device 605, and hence, the communication time can be short.

(Recording Step and Reproducing Step)

When the user operates to start recording of picture data, the control part 612 of the imaging device 605 makes the recording part 609 record image and voice information (picture data) to which additional information has been added. Thus, not only the picture data of the animal, that is, the subject, but also the additional information about the animal can be simultaneously recorded.

In recording the picture data in the recording part 609, information about a place where the picture data is captured may be further added to the picture data to be recorded. The information about the place may be provided by the local information server 601. Alternatively, when the imaging device 605 is applicable to the GPS, information about the place may be obtained by using it.

Furthermore, in recording the picture data in the recording part 309, time information at which the picture data is captured may be further added to the picture data to be recorded.

The user with the imaging device 605 makes a round of respective cages within the zoo and records picture data to which additional information has been added. In this system, the user can be informed of an animal that he or she has not been observed yet.

Specifically, since the additional information storage part 610 of the imaging device 605 stores information about all the animals that can be observed in the zoo, it can be determined which animals have been observed by the user by comparing the stored information with the information having been recorded in the recording part 609. Therefore, the system may be constructed so that the user can be informed of an animal that he or she has not observed yet.

When the picture data thus recorded is reproduced, the picture data and the additional information (image data and the voice data) are reproduced in a reproduce screen. Since the additional information is recorded, even when the actually captured picture data is not satisfactory, the image data can be secured as a substitute.

In this system, the additional information related to the picture data recorded in the recording part 609 alone is recorded, and hence, additional information about an uninteresting animal (an animal that has not been recorded as the picture data) is not recorded. Accordingly, the information about the uninteresting animal is not reproduced in reproducing the picture data.

On the contrary, information about an animal that has not been recorded as the picture data can be recorded in the recording part 609. Thus, for example, if pictures of some animals could not be taken in the zoo because the user did not have enough time, the information about the animals that could not be shot can be reproduced in reproducing the picture data.

Although the additional information is automatically added to be recorded in recording the picture data in this embodiment, the system may be constructed so that the user can select whether or not the additional information is to be recorded.

Furthermore, when there are a plurality of additional information, namely, for example, when there are a plurality of additional information of voice data and image data as in this embodiment, the system may be constructed so that the user can select which additional information is to be added for recording.

Embodiment 4

As described in each of the aforementioned embodiments, a variety of picture data are recorded in a recording part of an imaging device if picture data captured in a sports meeting has been recorded, picture data captured in a sight-seeing resort has been recorded and picture data captured in a zoo has been recorded.

If a variety of picture data are thus recorded in one recording part (recording medium), when the picture data recorded in the recording part is reproduced, it is sometimes difficult to determine when and where each of the picture data was captured.

Therefore, when, for example, each picture data recorded in a recording part is displayed so that a user can easily find where it was captured, the convenience for the user seems to be largely improved.

A system according to Embodiment 4 is constructed from this point of view. Specifically, this system includes, as shown in FIG. 13, an imaging device 705, a map server 704 for storing map data and an information server 701 connected to the imaging device 705 through a wireless and/or wire communication line 706.

The information server 701 includes a mapping part 702 and a communication part 703 for sending/receiving information through the network line 706.

The mapping part 702 acquires map data from the map server 704 in accordance with place information obtained from the imaging device 705 and adds the place information onto a map as described later.

The communication performed by the communication part 703 may utilize a public network. For example, a system (WAP (ezWeb: trademark) or i mode (trademark) for connecting a cellular phone (portable terminal) to the Internet may be utilized. Alternatively, a radio system for the PHS may be utilized. Furthermore, the communication part 703 may perform radio communication. The radio communication may be performed by a local radio system using, for example, Bluetooth (trademark). Alternatively, the radio communication may be performed by a radio system with directivity such as infrared-ray communication.

The imaging device 705 of this system is constructed as shown in FIGS. 1, 9 or 11.

Specifically, the imaging device 705 includes at least an image input part and a voice input part for capturing picture data (imaging part), a communication part for sending/receiving information through the communication line 706, a recording part for recording picture data captured by the imaging part, a display part for displaying the picture data, and a control part for controlling these parts. As described in each of the aforementioned embodiments, the imaging device 705 records picture data to which additional information has been added. Also, the imaging device 705 records the picture data to which place information and time at which the picture data is captured have been further added. The place information may be provided from an information server or measured by the imaging device 705 by using the GPS as described above.

FIG. 14 shows an example of the structure of data recorded in the recording part of the imaging device 705. In this case, additional information (the name of an event), the place information and the time are recorded correspondingly to each frame number of MPEG data corresponding to the picture data (image and voice information). It is noted that since the additional information has the hierarchical structure in this case, information of an upper layer and information of a lower layer are both recorded. Instead of this data structure, information of a start frame and an end frame of each picture data alone may be recorded correspondingly to the name of an event and the place information. Alternatively, information of a start time and an end time alone may be recorded correspondingly to the name of an event and the place information.

Next, processing performed in the information server 701 will be described with reference to a flowchart of FIG. 15.

First, in step S1, additional information (the name of an event, the place information and the time) sent from the imaging device 705 through the communication line 706 is acquired.

In subsequent step S2, on the basis of the acquired place information, map data corresponding to the place is acquired from the map server 704.

In step S3, on the basis of the place information and the map data acquired in steps S1 and S2, mapping for adding the place information onto a map is performed. Also, the name of the event and the time corresponding to each place information are added onto the map.

In step S4, the map data created in step S3 is sent to the imaging device 705 through the communication line 706.

Figure 16:
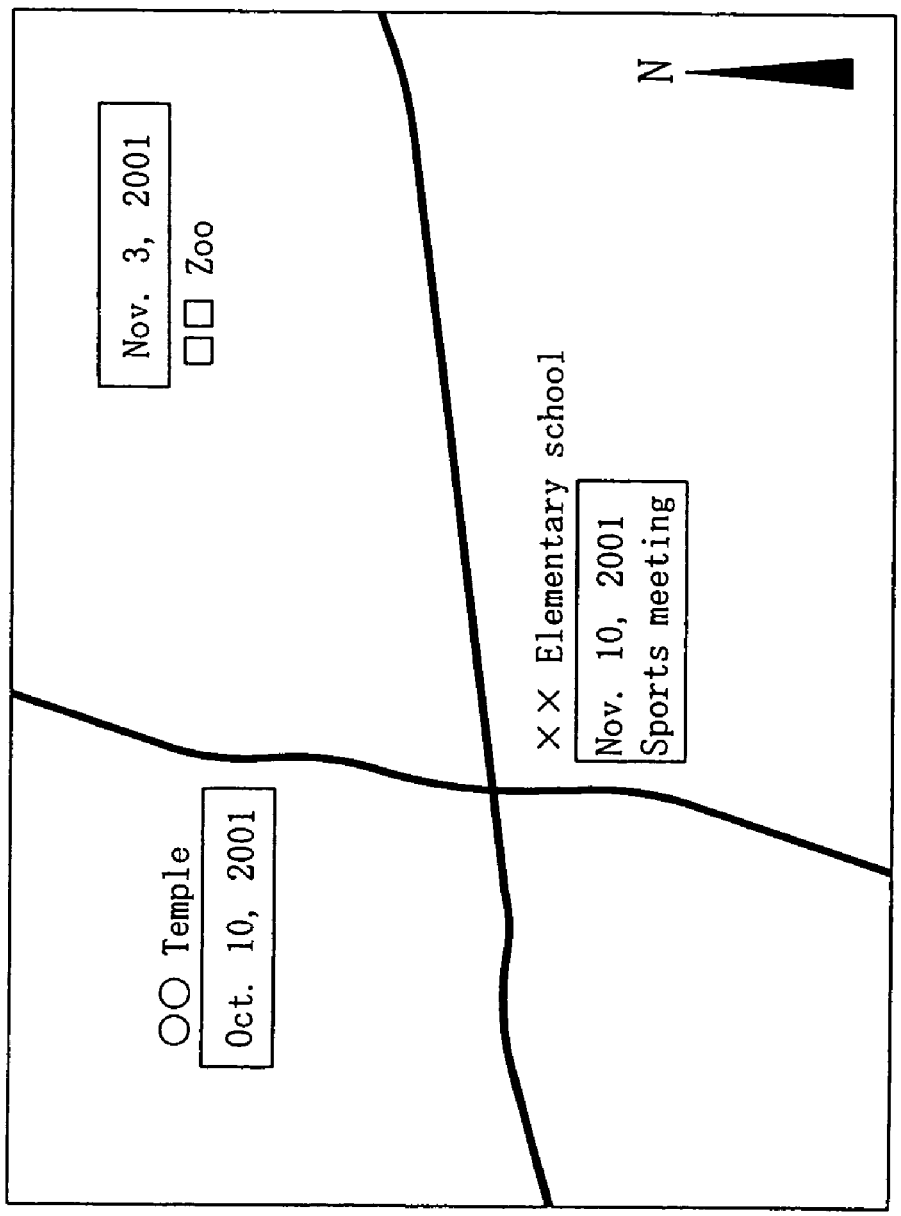
FIG. 16 is a diagram for exemplifying a map onto which place information is added.

In the imaging device 705 having received the map data, the created map data is displayed. Thus, places at which the respective picture data recorded in the recording part were obtained are shown on the map as shown in FIG. 16, and each place is provided with the name of the event and the time of the capture. In this manner, a user can easily find the places where respective picture data are captured, resulting in largely improving the convenience for the user.

Although the map is created by the information server 701 in this system, the map may be created by, for example, a personal computer (PC) installed at the home of the user. In this case, the system is constructed so that the PC can be connected to the imaging device 705 and the map server 704. When the PC performs mapping in accordance with the flowchart of FIG. 15 on the basis of the additional information (the name of the event, the place information and the time) obtained from the imaging device 705 and the map data obtained from the map server 705, the map shown in FIG. 16 can be displayed on a monitor of the PC.

(Modification 1)

The system according to Embodiment 4 is a system for showing, on the map, the place where each picture data recorded in the recording part of the imaging device 705 is captured. Accordingly, this system may not be the system described in each of the aforementioned embodiments in which information (additional information) is delivered from the information server to the imaging device and picture data to which the additional information has been added is displayed on the display part while picture data is being captured with the imaging device.

This system is an imaging system for creating a map on the basis of picture data captured by the imaging part. In other words, this imaging system is a system including a recording part for recording picture data captured by the imaging part with adding information about the place where the picture data is captured, and a map creating part for creating map data in which the place where the picture data is captured is shown on a map on the basis of the information about the place recorded by the recording part.

Thus, the map creating part (mapping part) creates, on the basis of the information about the place recorded by the recording part, the map data in which the place is shown on the map. In this manner, the place where each picture data is captured is shown on the map. Therefore, the user can easily recognize each place of the capture. As a result, the convenience for the user is largely improved.

The system may further include a display part for displaying the map data created by the map creating part.

Also, the system may further include a place information acquiring part for acquiring information about a place where picture data is captured. In this case, the recording part records the information about the place acquired by the place information acquiring part added to the picture data.

The place information acquiring part may utilize, for example, the GPS. Alternatively, the place information acquiring part may receive, through a communication line, information about a place delivered in accordance with the place where the imaging part is capturing picture data.

Furthermore, the recording part may record the picture data with further adding information about the subject to be shot (such as index information about the name of an event or the like). In this case, the map creating part may further add, on the basis of the index information recorded by the recording part, the index information to the map data.

Thus, each place where the picture data is captured is shown on the map as well as the index information about the picture data is shown. In this manner, the user can easily recognize the place and the subject of the picture data.

Moreover, the recording part may record the picture data with further adding information of the time and the day when the picture data is captured. In this case, the map creating part further adds, on the basis of the information of the time and the day recorded by the recording part, the information of the time and the day to the map data.

Thus, each place where the picture data is captured is shown on the map as well as the time and the day when the picture data is captured is shown. In this manner, the user can easily recognize where and when the picture data is captured.

The imaging device of this system may be a device including a recording part for recording picture data captured by an imaging part with adding information about a place where the picture data is captured. The recording part may record the picture data with further adding information about a subject of the picture data. Also, the recording part may record the picture data with further adding information of the time and the day when the picture data is captured.

The imaging device may further include a place information acquiring part for acquiring information about a place where the picture data is captured.

The imaging device may further include a communication part for sending information about the place recorded by the recording part through a communication line.

A map creating device of this system may be any device that includes a map creating part for creating, on the basis of the information about the place added to the picture data to be recorded, map data in which a place where the picture data is captured is shown on a map.

The map creating device may further include a receiving part for receiving information about the place through a communication line.

An imaging method of this system may be any imaging method for creating a map on the basis of picture data captured by the imaging part. Specifically, the imaging method may be any imaging method including an imaging step of capturing picture data with the imaging device; a recording step of recording the picture data captured in the imaging step with adding information about a place where the picture data is captured; and a map creating step of creating, on the basis of the information about the place recorded in the recording step, map data in which the place where the picture data is captured is shown on a map.

In this manner, in the map creating step, on the basis of the information about the place recorded in the recording step, the map data in which the place is shown on a map is created. Thus, each place where the picture data is captured is shown on the map. Accordingly, the user can easily recognize each place where the picture data is captured.

The imaging method may further include a displaying step of displaying the map data created in the map creating step.

(Modification 2)

An imaging device applicable to this system is not limited to a video camera for capturing and recording moving picture data. A digital still camera for capturing and recording still picture data is applicable to this system. The basic architecture of a digital still camera is substantially the same as that of the imaging device 105, 305 or 605 shown in FIGS. 1, 9 or 11 except that it does not have a voice input part.

The data structure shown in FIG. 14 is a data structure for moving picture data, and the additional information (the name of the event), the place information and the time are recorded correspondingly to each frame number. On the other hand, when a digital still camera is used, the additional information (the name of the event), the place information and the time may be recorded correspondingly to an identification number of still picture data (or a file name of still picture data) instead of the frame number.

Figure 15:
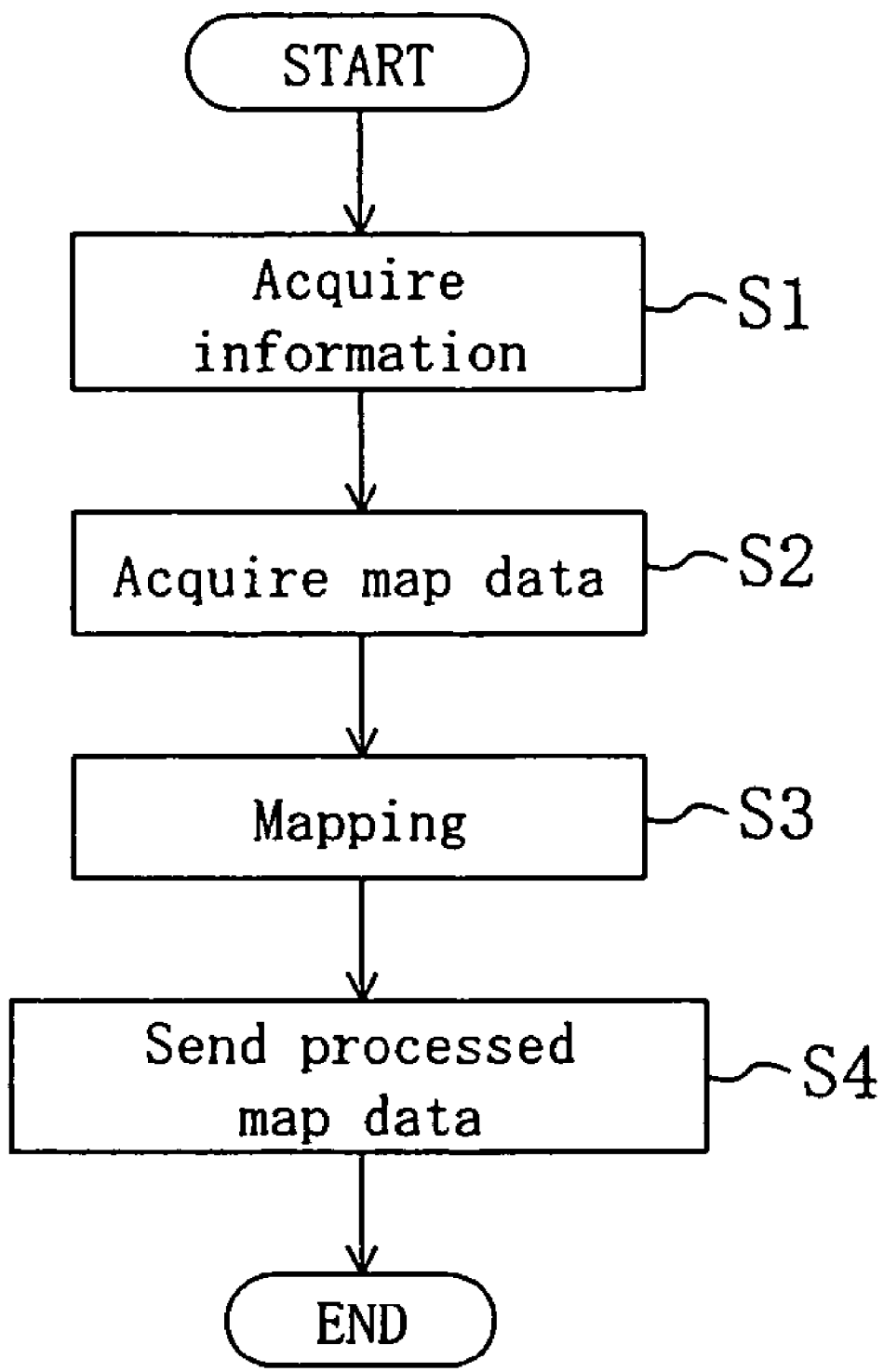
FIG. 15 is a flowchart for creating map data.

In this manner, through the processing performed in accordance with the flowchart of FIG. 15, a place where each still picture data recorded in the recording part of the digital still camera is captured is shown on a map.

Embodiment 5

Embodiment 5 relates to an imaging device.

Each imaging device 105, 305, 605 or 705 described in each of the aforementioned embodiments may be constructed as integration of the image input part, the voice input part, the communication part, the recording part, the display part and the control part.

Figure 17:
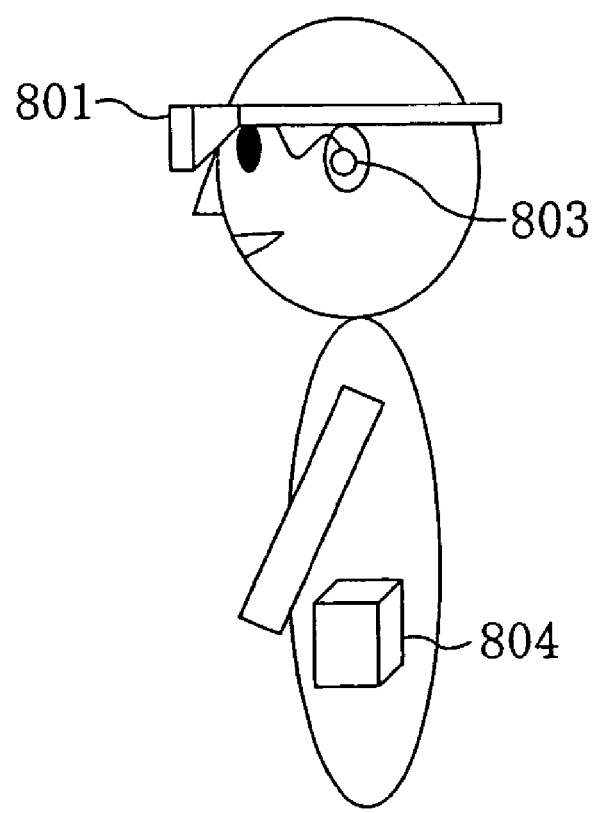
FIG. 17 is a side view for roughly showing an imaging device according to Embodiment 5.
Figure 18:
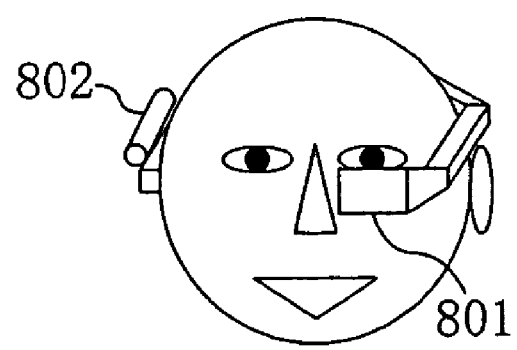
FIG. 18 is a front view for roughly showing the imaging device according to Embodiment 5.

On the other hand, an imaging device may be constructed, for example, as shown in FIGS. 17 and 18. This imaging device includes a display part (head-mount display) 801 disposed in a position of an eye of a user, an imaging part (an image input part and a voice input part) 802 provided on the head of the user, a control unit 804 including a communication part, a recording part and a control part, and an earphone 803 for checking a voice input from the voice input part. In other words, this imaging device is wearable.

As in this imaging device, when the display part 801 is disposed in the position of the eye of the user, the user can easily check additional information displayed on this display part 801, and hence, an effect to avoid losing an opportunity for taking a desired picture can be attained.

Furthermore, the imaging device of each of the aforementioned embodiments may be a digital still camera for capturing and recording still picture data. The basic architecture of a digital still camera is substantially the same as that of the imaging device 105, 305 or 605 shown in FIGS. 1, 9 or 11 except that it does not include a voice input part.

The invention claimed is:

1. An information-added imaging method for adding additional information to picture data captured by an imaging device, comprising:

an imaging step of said imaging device capturing picture data;

a receiving step of said imaging device receiving information about a schedule of events through a wireless and/or wire communication line;

an adding step of adding additional information to said picture data captured in the imaging step on the basis of said information received in the receiving step while the picture data is being captured in the imaging step;

a displaying step of displaying, in said imaging device, picture data to which said additional information has been added in the adding step while picture data is being captured in the imaging step; and a recording step of recording said picture data to which said additional information has been added in the adding step, wherein information about an event in which a plurality of event items are successively held with time is received in the receiving step, reservation is made for making a request for informing start of a specified event item at timing when said specified event item is to be held, information about an event item corresponding to the content of said reservation delivered at the timing when said event item is to be held is received in the receiving step, and when information is received in the receiving step, additional information is added to said picture data on the basis of said received information in the adding step.

2. An information-added imaging method for adding additional information to picture data captured by an imaging device, comprising:

an imaging step of said imaging device capturing picture data;

a receiving step of said imaging device receiving information about a schedule of events through a wireless and/or wire communication line;

an adding step of adding additional information to said picture data captured in the imaging step on the basis of said information received in the receiving step while the picture data is being captured in the imaging step;

a displaying step of displaying, in said imaging device, picture data to which said additional information has been added in the adding step while picture data is being captured in the imaging step; and a recording step of recording said picture data to which said additional information has been added in the adding step, wherein information about an event in which a plurality of event items are successively held with time is received in the receiving step, a program of the event including a currently held event item and preceding and following event items is displayed in accordance with progress of the event in the displaying step.

3. An information-added imaging method for adding additional information to picture data captured by an imaging device, comprising:

an imaging step of said imaging device capturing picture data;

a receiving step of said imaging device receiving information about a schedule of events through a wireless and/or wire communication line;

an adding step of adding additional information to said picture data captured in the imaging step on the basis of said information received in the receiving step while the picture data is being captured in the imaging step;

a displaying step of displaying, in said imaging device, picture data to which said additional information has been added in the adding step while picture data is being captured in the imaging step; and a recording step of recording said picture data to which said additional information has been added in the adding step, wherein information about an event in which a plurality of event items are successively held with time is received in the receiving step, a program of the event including currently held and following event items is displayed in accordance with progress of the event in the displaying step.

4. An information-added imaging method for adding additional information to picture data captured by an imaging device, comprising:

an imaging step of said imaging device capturing picture data;

a receiving step of said imaging device receiving information about a schedule of events through a wireless and/or wire communication line;

an adding step of adding additional information to said picture data captured in the imaging step on the basis of said information received in the receiving step while the picture data is being captured in the imaging step;

a displaying step of displaying, in said imaging device, picture data to which said additional information has been added in the adding step while picture data is being captured in the imaging step; and a recording step of recording said picture data to which said additional information has been added in the adding step, wherein selection information for additional information stored in said imaging device is received in the receiving step, the information-added imaging method further comprises a selecting step of selecting additional information on the basis of said selection information received in the receiving step, and additional information selected in the selecting step is added to said picture data in the adding step.

5. An imaging device in which additional information is added to picture data captured by an imaging part, comprising:

a display part for displaying picture data captured by said imaging part;

a recording part for recording picture data captured by said imaging part;

a communication part for sending/receiving information about a schedule of events through a wireless and/or wire communication line; and a control part for controlling said imaging part, said display part, said recording part and said communication part, wherein said control part adds additional information to picture data captured by said imaging part on the basis of information received by said communication part while capturing picture data with said imaging part, makes said display part display picture data to which said additional information has been added while capturing picture data with said imaging part and makes said recording part record said picture data to which said additional information has been added, information received by said communication part is information about an event in which a plurality of event items are successively held with time that is delivered in accordance with reservation for requesting for informing start of a specific event item at timing when said specific event item is to be held, and when said communication part receives information about an event item corresponding to the content of the reservation delivered at the timing when said event item is to be held, said control part adds additional information to said picture data on the basis of said received information.

* * * * *